United States Patent
Zhou et al.

(10) Patent No.: US 8,271,778 B1
(45) Date of Patent: Sep. 18, 2012

(54) SYSTEM AND METHOD FOR MONITORING SECURE DATA ON A NETWORK

(75) Inventors: Todd Tao Zhou, Milpitas, CA (US); Ricardo Batista, Gilroy, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 970 days.

(21) Appl. No.: 10/202,338

(22) Filed: Jul. 24, 2002

(51) Int. Cl.
*H04L 29/06* (2006.01)
(52) U.S. Cl. ............. 713/154; 726/14; 709/224
(58) Field of Classification Search ............. 713/154; 726/13, 14; 709/224
See application file for complete search history.

(56) References Cited

U.S. PATENT DOCUMENTS

| | | | |
|---|---|---|---|
| 3,540,003 A | 11/1970 | Murphy | |
| 3,696,297 A | 10/1972 | Otero | |
| 3,818,458 A | 6/1974 | Deese | |
| 3,906,454 A | 9/1975 | Martin | |
| 4,058,829 A | 11/1977 | Thompson | |
| 4,125,892 A | 11/1978 | Fuduka et al. | |
| 4,166,290 A | 8/1979 | Furtman et al. | |
| 4,236,209 A | 11/1980 | Lombardo, Jr. et al. | |
| 4,283,709 A | 8/1981 | Lucero et al. | |
| 4,355,372 A | 10/1982 | Johnson et al. | |
| 4,356,545 A | 10/1982 | West | |
| 4,473,824 A | 9/1984 | Claytor | |
| 4,516,216 A | 5/1985 | Armstrong | |
| 4,546,382 A | 10/1985 | McKenna et al. | |
| 4,566,030 A | 1/1986 | Nickerson et al. | |
| 4,603,232 A | 7/1986 | Kurland et al. | |
| 4,658,290 A | 4/1987 | McKenna et al. | |
| 4,677,552 A | 6/1987 | Sibley et al. | |
| 4,695,880 A | 9/1987 | Johnson et al. | |
| 4,700,378 A | 10/1987 | Brown | |
| 4,706,121 A | 11/1987 | Young | |
| 4,713,791 A | 12/1987 | Saluski | |
| 4,718,025 A | 1/1988 | Minor et al. | |
| 4,725,886 A | 2/1988 | Galumbeck et al. | |
| 4,740,912 A | 4/1988 | Whitaker | |
| 4,745,559 A | 5/1988 | Willis et al. | |

(Continued)

FOREIGN PATENT DOCUMENTS

EP 0228458 B1 6/1986

(Continued)

OTHER PUBLICATIONS

Hahn "Evaluating Web Site Performance in Internet-Based Selling From a Business Value Perspective", Submitted to 2001 International Conference on Electronic Commerce, Oct. 2001, Vienna, Austria.*

(Continued)

*Primary Examiner* — Hadi Armouche
(74) *Attorney, Agent, or Firm* — Hanley, Flight & Zimmerman, LLC

(57) ABSTRACT

A system and method for monitoring secure digital data on a network are provided. An exemplary network monitoring system may include a network device in communication with a user and a network. Further, a server may be in communication with the network. A browser and monitoring program may be stored on the network device, and the network device may receive secure digital data from the network. The browser may convert the secure digital data or a portion thereof into source data, and the monitoring program may transfer the source data or a portion thereof to the server. In an exemplary embodiment, the monitoring program may include a service component and an interface program.

27 Claims, 10 Drawing Sheets

U.S. PATENT DOCUMENTS

| | | |
|---|---|---|
| 4,751,578 A | 6/1988 | Reiter et al. |
| 4,757,456 A | 7/1988 | Benghait |
| 4,774,658 A | 9/1988 | Lewin |
| 4,783,648 A | 11/1988 | Homma et al. |
| 4,792,921 A | 12/1988 | Corwin |
| 4,817,080 A | 3/1989 | Soha |
| 4,823,290 A | 4/1989 | Fasack et al. |
| 4,831,582 A | 5/1989 | Miller et al. |
| 4,845,658 A | 7/1989 | Gifford |
| 4,849,879 A | 7/1989 | Chinnaswamy et al. |
| 4,868,866 A | 9/1989 | Williams, Jr. |
| 4,887,308 A | 12/1989 | Dutton |
| 4,907,188 A | 3/1990 | Suzuki |
| 4,912,466 A | 3/1990 | Call |
| 4,912,522 A | 3/1990 | Oates et al. |
| 4,924,488 A | 5/1990 | Kosich |
| 4,935,870 A | 6/1990 | Burk, Jr. et al. |
| 4,954,699 A | 9/1990 | Coffey et al. |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,062,147 A | 10/1991 | Pickett et al. |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood et al. |
| 5,140,419 A | 8/1992 | Galumbeck et al. |
| 5,150,116 A | 9/1992 | West |
| 5,159,685 A | 10/1992 | Kung |
| 5,161,109 A | 11/1992 | Keating et al. |
| 5,166,866 A | 11/1992 | Kim et al. |
| 5,181,113 A | 1/1993 | Chang |
| 5,204,947 A | 4/1993 | Bernstein et al. |
| 5,208,588 A | 5/1993 | Nishiyama |
| 5,210,530 A | 5/1993 | Kammerer et al. |
| 5,212,684 A | 5/1993 | MacNamee et al. |
| 5,214,792 A | 5/1993 | Alwadish |
| 5,220,522 A | 6/1993 | Wilson et al. |
| 5,220,655 A | 6/1993 | Tsutsui |
| 5,223,827 A | 6/1993 | Bell et al. |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,681 A | 8/1993 | Kagan et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,253,346 A | 10/1993 | Okabayashi et al. |
| 5,260,878 A | 11/1993 | Luppy |
| 5,262,860 A | 11/1993 | Fitzpatrick et al. |
| 5,267,314 A | 11/1993 | Stambler |
| 5,267,351 A | 11/1993 | Reber et al. |
| 5,276,458 A | 1/1994 | Sawdon |
| 5,276,789 A | 1/1994 | Besaw et al. |
| 5,281,962 A | 1/1994 | Vanden Heuvel et al. |
| 5,283,639 A | 2/1994 | Esch et al. |
| 5,287,363 A | 2/1994 | Wolf et al. |
| 5,297,249 A | 3/1994 | Bernstein et al. |
| 5,301,350 A | 4/1994 | Rogan et al. |
| 5,309,243 A | 5/1994 | Tsai |
| 5,315,093 A | 5/1994 | Stewart |
| 5,315,580 A | 5/1994 | Phaal |
| 5,317,140 A | 5/1994 | Dunthorn |
| 5,321,831 A | 6/1994 | Hirose |
| 5,321,838 A | 6/1994 | Hensley et al. |
| 5,327,237 A | 7/1994 | Gerdes et al. |
| 5,327,554 A | 7/1994 | Palazzi, III et al. |
| 5,331,544 A | 7/1994 | Lu et al. |
| 5,333,302 A | 7/1994 | Hensley et al. |
| 5,339,239 A | 8/1994 | Manabe et al. |
| 5,339,412 A | 8/1994 | Fueki |
| 5,347,632 A | 9/1994 | Filepp et al. |
| 5,349,662 A | 9/1994 | Johnson et al. |
| 5,351,278 A | 9/1994 | Koshishiba et al. |
| 5,351,293 A | 9/1994 | Michener et al. |
| 5,355,327 A | 10/1994 | Stent et al. |
| 5,355,484 A | 10/1994 | Record et al. |
| 5,359,367 A | 10/1994 | Stockill |
| 5,361,359 A | 11/1994 | Tajalli et al. |
| 5,367,677 A | 11/1994 | Stanfill |
| 5,371,846 A | 12/1994 | Bates |
| 5,374,951 A | 12/1994 | Welsh |
| 5,375,070 A | 12/1994 | Hershey et al. |
| 5,379,380 A | 1/1995 | Mori et al. |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,398,336 A | 3/1995 | Tantry et al. |
| 5,406,269 A | 4/1995 | Baran |
| 5,408,607 A | 4/1995 | Nishikawa et al. |
| 5,410,598 A | 4/1995 | Shear |
| 5,412,778 A | 5/1995 | Andres |
| 5,414,809 A | 5/1995 | Hogan et al. |
| 5,418,728 A | 5/1995 | Yada |
| 5,461,708 A | 10/1995 | Kahn |
| 5,483,658 A | 1/1996 | Grube et al. |
| 5,485,897 A | 1/1996 | Matsumoto et al. |
| 5,491,820 A | 2/1996 | Belove et al. |
| 5,495,581 A | 2/1996 | Tsai |
| 5,499,340 A | 3/1996 | Barritz |
| 5,524,073 A | 6/1996 | Stambler |
| 5,555,303 A | 9/1996 | Stambler |
| 5,557,333 A | 9/1996 | Jungo et al. |
| 5,560,038 A | 9/1996 | Haddock |
| 5,568,471 A | 10/1996 | Hershey et al. |
| 5,572,643 A | 11/1996 | Judson |
| 5,594,911 A | 1/1997 | Cruz et al. |
| 5,604,867 A | 2/1997 | Harwood |
| 5,615,264 A | 3/1997 | Kazmierczak et al. |
| 5,623,652 A | 4/1997 | Vora et al. |
| 5,634,100 A | 5/1997 | Capps |
| 5,646,998 A | 7/1997 | Stambler |
| 5,648,965 A | 7/1997 | Thadani et al. |
| 5,671,283 A | 9/1997 | Michener et al. |
| 5,673,382 A | 9/1997 | Cannon et al. |
| 5,675,510 A | 10/1997 | Coffey et al. ............ 364/514 A |
| 5,696,702 A | 12/1997 | Skinner et al. |
| 5,706,502 A | 1/1998 | Foley et al. |
| 5,708,709 A | 1/1998 | Rose |
| 5,708,780 A | 1/1998 | Levergood et al. |
| 5,710,915 A | 1/1998 | McElhiney |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,732,218 A | 3/1998 | Bland et al. |
| 5,737,619 A | 4/1998 | Judson |
| 5,740,549 A | 4/1998 | Reilly et al. |
| 5,787,253 A | 7/1998 | McCreery et al. |
| 5,793,302 A | 8/1998 | Stambler |
| 5,796,952 A | 8/1998 | Davis et al. |

| | | |
|---|---|---|
| 5,799,292 A | 8/1998 | Hekmatpour |
| 5,819,156 A | 10/1998 | Belmont |
| 5,819,285 A | 10/1998 | Damico et al. |
| 5,823,879 A | 10/1998 | Goldberg et al. |
| 5,829,001 A | 10/1998 | Li et al. |
| 5,835,923 A | 11/1998 | Shibata et al. |
| 5,838,919 A | 11/1998 | Schwaller et al. |
| 5,848,396 A | 12/1998 | Gerace |
| 5,870,546 A | 2/1999 | Kirsch |
| 5,878,384 A | 3/1999 | Johnson et al. |
| 5,926,168 A | 7/1999 | Fan |
| 5,931,912 A | 8/1999 | Wu et al. |
| 5,933,811 A | 8/1999 | Angles et al. |
| 5,935,207 A | 8/1999 | Logue et al. |
| 5,936,541 A | 8/1999 | Stambler |
| 5,948,061 A | 9/1999 | Merriman et al. |
| 5,951,643 A | 9/1999 | Shelton et al. |
| 5,956,483 A | 9/1999 | Grate et al. |
| 5,958,010 A | 9/1999 | Agarwal et al. |
| 5,963,914 A | 10/1999 | Skinner et al. |
| 5,964,839 A | 10/1999 | Johnson et al. |
| 5,974,148 A | 10/1999 | Stambler |
| 5,982,917 A | 11/1999 | Clarke et al. |
| 5,986,653 A | 11/1999 | Phathayakorn et al. |
| 5,999,178 A | 12/1999 | Hwang et al. |
| 6,014,638 A | 1/2000 | Burge et al. |
| 6,018,619 A | 1/2000 | Allard et al. |
| 6,052,730 A | 4/2000 | Felciano et al. |
| 6,070,145 A | 5/2000 | Pinsley et al. |
| 6,078,324 A | 6/2000 | Phathayakorn et al. |
| 6,108,637 A | 8/2000 | Blumenau |
| 6,112,238 A | 8/2000 | Boyd et al. |
| 6,112,240 A | 8/2000 | Pogue et al. |
| 6,115,608 A | 9/2000 | Duran et al. |
| 6,167,358 A | 12/2000 | Othmer et al. |
| 6,173,311 B1 | 1/2001 | Hassett et al. |
| 6,185,586 B1 | 2/2001 | Judson |
| 6,250,930 B1 | 6/2001 | Mintz |
| 6,264,560 B1 | 7/2001 | Goldberg et al. |
| 6,275,854 B1 | 8/2001 | Himmel et al. |
| 6,279,036 B1 | 8/2001 | Himmel et al. |
| 6,279,112 B1 | 8/2001 | O'Toole, Jr. et al. |
| 6,317,787 B1 | 11/2001 | Boyd et al. |
| 6,324,546 B1 | 11/2001 | Ka et al. |
| 6,360,261 B1 | 3/2002 | Boyd et al. |
| 6,393,479 B1 | 5/2002 | Glommen et al. |
| 6,397,359 B1 | 5/2002 | Chandra et al. |
| 6,408,335 B1 | 6/2002 | Schwaller et al. |
| 6,418,470 B2 | 7/2002 | Blumenau |
| 6,434,532 B2 | 8/2002 | Goldband et al. |
| 6,449,604 B1 | 9/2002 | Hansen et al. |
| 6,457,025 B2 | 9/2002 | Judson |
| 6,466,970 B1 | 10/2002 | Lee et al. |
| 6,569,095 B2 | 5/2003 | Eggers |
| 6,601,100 B2 | 7/2003 | Lee et al. |
| 6,609,239 B1 | 8/2003 | Xavier |
| 6,621,881 B2 | 9/2003 | Srinivasan |
| 6,625,648 B1 | 9/2003 | Schwaller et al. |
| 6,662,195 B1 | 12/2003 | Langseth et al. |
| 6,662,227 B2 | 12/2003 | Boyd et al. |
| 6,671,715 B1 | 12/2003 | Langseth et al. |
| 6,711,689 B2 * | 3/2004 | Lumme et al. ............ 726/22 |
| 6,712,702 B2 | 3/2004 | Goldberg et al. |
| 6,719,660 B2 | 4/2004 | Palazzolo |
| 6,766,370 B2 | 7/2004 | Glommen et al. |
| 6,807,558 B1 | 10/2004 | Hassett et al. |
| 6,859,833 B2 | 2/2005 | Kirsch et al. |
| 7,017,143 B1 | 3/2006 | Andrew et al. |
| 2002/0013786 A1* | 1/2002 | Machalek ............ 707/503 |
| 2002/0019763 A1* | 2/2002 | Linden et al. ............ 705/10 |
| 2002/0040394 A1 | 4/2002 | Shapira |
| 2002/0040395 A1 | 4/2002 | Davis et al. |
| 2002/0065912 A1* | 5/2002 | Catchpole et al. ............ 709/224 |
| 2002/0077787 A1 | 6/2002 | Rappaport et al. |
| 2002/0078191 A1 | 6/2002 | Lorenz |
| 2002/0099812 A1 | 7/2002 | Davis et al. |
| 2002/0099818 A1 | 7/2002 | Russell et al. |
| 2002/0099819 A1 | 7/2002 | Hattori et al. |
| 2002/0103664 A1 | 8/2002 | Olsson et al. |
| 2002/0112048 A1 | 8/2002 | Gruyer et al. |
| 2002/0112082 A1* | 8/2002 | Ko et al. ............ 709/246 |
| 2002/0161673 A1 | 10/2002 | Lee et al. |
| 2003/0046303 A1 | 3/2003 | Chen et al. |
| 2003/0046385 A1 | 3/2003 | Vincent |
| 2003/0062223 A1 | 4/2003 | Coyle et al. |
| 2003/0144868 A1 | 7/2003 | MacIntyre et al. |
| 2003/0163563 A1 | 8/2003 | Bean |
| 2003/0187677 A1 | 10/2003 | Malireddy et al. |
| 2003/0208578 A1 | 11/2003 | Taraborelli et al. |
| 2003/0231203 A1 | 12/2003 | Gallella |
| 2004/0221033 A1 | 11/2004 | Davis et al. |
| 2005/0114511 A1 | 5/2005 | Davis et al. |

FOREIGN PATENT DOCUMENTS

| | | |
|---|---|---|
| EP | 0228242 A3 | 8/1987 |
| EP | 0451384 A1 | 4/1990 |
| EP | 0388658 A1 | 9/1990 |
| EP | 0632382 A1 | 6/1993 |
| EP | 0747841 A1 | 12/1996 |
| EP | 0228458 B2 | 10/1997 |

OTHER PUBLICATIONS

Brian K. Holman, et al. (1997) "Instant JavaScript".
Aaron E. Walsh (1996) "New! Java for Dummies".
Aaron E. Walsh (1996) "Foundations of Java Programming for the World Wide Web".
Gordon McComb (1996) "JavaScript Sourcebook—Create Interactive JavaScript Programs for the World Wide Web".
David Flanagan (1997) "Deluxe Edition—Java in a Nutshell—Java 1.1".
Gary Cornell, et al. (1996) "Core Java".
Gary Cornell, et al. (1997) "Core Java".
David Flanagan (1996) "Java in a Nutshell—Java 1.0".
David Flanagan (1996) "JavaScript: The Definitive Guide, Beta Edition".
Gamelan, Network and Communications, pp. 1-7.
Dr. Dobbs articles (1995) "Tracking Home PAge Hits, by Ann Lynnworth", http://www.ddj.com/documents/s=979/ddj9517d/, printed on Jul. 14, 2005, pp. 1-11.
Prof.Dr.rer.nat. Wolf-Jurgen Becker, Department of Engineering Measurement, UNI Kassel, FB16, Engineering Measurement, p. 1.
Applets and Applications (last modification 1996), Department of Engineering Measurement, http://web.archive.org/web/19970802020436/http://www..uni-kassel.de/fb16/ipm/mt/javae/html, printed on May 24, 2006, pp. 1-5.
Browser History Timeline: Overview, Browser Timelines, http://blooberry.com/indexdot/history/browsers6.htm, printed on May 24, 2006, pp. 1-3.
EmailMsg<9306182231.AA03641@austin.BSDI.com>, lexus log file summaries, http://ksi.cpsu.ucalgary.ca/archives/WWW-TALK/www-talk-1993q2.messages/563.html, printed on May 24, 2006, pp. 1-4.
WB Project-assorted design notes, WOrking Notes, http://www.w3.org/History/1994/WWW/WorkingNotes/Overview.html, printed on May 24, 2006, pp. 1-2.
Google search "fwgstat", Looking for a GN log, http://groups.google.com/group/comp.infosystems.gopher/browse_thread/thread/15dc16c0284c02d0/953bf38f2ceel5ea?q=fwgstat&mum=34..., printed on May 24, 2006, pp. 1-3.
Google search "fwgstat", Single program to summarize logs of several kinds of severs, http://groups.google.com/group/comp.infosystems.gopher/browse_thread/thread/4790232128a9157/d1534978ddddf998?q=fwgstat&mum=33..., printed on May 24, 2006, pp. 1-10.
Google search "getsites" Announcing getsites 1.5, a web log analyzer, http://groups.google.com/group/comp.infosystems.gopher/browse_thread/thread/a36eeb6daea735d8/0fa7adf53e51b894?q=getsites&mum-=19&h..., printed on May 24, 2006, pp. 1-2.
Google search "wwwstat", Announcing wwwstat-0.1—an access log summary program, http://groups.google.com/group/comp.

infosystems.gopher/browse_thread/thread/784aa9c20470d342/ fc0cde0742990875?q=wwwstat&mum=43..., printed on May 24, 2006, pp. 1-8.
Google search wusage 1.0), WUSAGE 1.0: Server Usage Graphs. Top Ten . . . , http://groups.google.com/group/comp.infosystems. gopher/browse_thread/thread/a07834d8b38dbc4f/ f05bf1df25d47fd3?q=wusage+1.0&mum=1..., printed on May 24, 2006, pp. 1-2.
Google search "getstats" Announcing getsites 1.0, a web log analyzer, http://groups.google.com/group/comp.infosystems.gopher/ browse_thread/thread/1009159de1aaf6aa/ ed924b219923cc7d?q=getstats&mum=1&h1..., printed on May 24, 2006, pp. 1-3.
First International Conference on the World-Wide Web, (May 25-27, 1994) CERN, http://www94.web.cem.ch/WWW94/, printed on May 24, 2008, pp. 1-2.
Plenary at WWW Geneva 94. Plenary talk by Tim BL at WWWF94:Overview, http://www.w3/org/Talks/WWW94Tim/, printed on May 24, 2006, pp. 1-4.
Mosaic Communications Changes Name to "Netscape Communications Corporation", Communications News Release, http://www. holgermetzger.de/netdcape/NetscapeCom-municationsNewsRelease.htm, printed on May 24, 2006, pp. 1-2.
Google search "cgi hit counter", WWW hit counter: does this work?, http://groups.google.com/group/comp.infosystems.gopher/ browse_thread/thread/b4ef428d8c96d525/ 3e18b779b1dad79e?qcgi+hit+couonter&mum=74&..., printed on May 24, 2006, pp. 1-7.
Welcome to Netscape, Getting Started, http://hnehostng.com/mirrors/Origin_of_a_Browser/mcom.10.1994/home/welcome.html, printed on May 24, 2006, pp. 1-2.
Google search "cgi hit counter", Hit counter, http://groups.google. com/group/comp.infosystems.gopher/browse_thread/thread/ 390dc231bb3f0097/64bddc80086f124b?q=cgi+hit+counte..., printed on May 24, 2006, pp. 1-2.
WWW Homepage Access Counter and Clock!, http://www.muquit. com/muquit/software/Count/Count.html, printed on May 24, 2006, pp. 1-32.
Javapage, Java, http:/web.archive.org/web/20040712072256/http:// www.groton.k12.ct.us/WWW/fsr/student/Spring02/W..., printed on May 24, 2006, pp. 1-4.
Google search "hit counter", Access Counters . . . , http://groups. google.com/group/comp.infosystems.authoring.html/browse_ thread/thread/e515dad2e5d1e8cc/0ebdc329e9ec00cc?q=hit+c..., printed on May 24, 2006, pp. 1-7.
CGI: Common Gateway Interface, http://www.w3.org/CGI/, printed on May 24, 2006, pp. 1-2.
Computers and the Internet, Webpage counters, http://www.earthstation9.com/counters.htm, printed on May 24, 2006, pp. 1-2.
Windows based only on internet BBS software—The official BBS FAQ, http://www.sysopworld.com/bbsfaq/ch02.2.4.htm, printed on May 24, 2006, pp. 1-23.
Crazy Counter, GIF89a Version, last modified Jan. 31, 1996, pp. 1-2.
Crazy Counter (GIF89a) animated, last modified Mar. 8, 1996, p. 1.
Crazycounter.java, (1996), pp. 1-5.
Horace's Java, Page View Timer Demo, Form 1, Page View Timer Applet, pp. 1-2.
Hello Net! Counter0; p. 1.
JavaWorld (Apr. 1996), URL: http://www.javaworld.com, last updated Apr. 1, 1996, p. 1.
JavaWorld editorial calendar (1996), pp. 1-2.
JavaWorld, URL: http://www.javaworld.com, last updated Mar. 8, 1996, p. 1.
Javascript Announcement.txt (Dec. 4, 1995), Sun and Netscape Announce Javascript, pp. 1-8.
Webthreads Announcement.txt (Oct. 8, 1996), Yermo Lamers, pp. 1-5.
Gary McGraw, Ph.d., et al. (1996) "Untangling the Woven Web: Testing Web-based Software", pp. 1-8.
A visual history of web measurement:Vendor emergence, Technology Deployment and Seminal Events, p. 1.
Applet Demos, Sep. 30, 1995-Nov. 22, 1995 form.java: 1 class, 4kByte, pp. 1-2.
Counter, by java@mt.e-technik.uni-kassel.de, p. 1.
Applet Collection, Ticker, pp. 1-5.
Applet Kollektion, Ticker, pp. 1-5.
Rebecca Tapley, et al. "The Official Gamelan Java Directory", EarthWeb, pp. 1-6.
Michael Girdley, et al. (1996) Web Programming with Java, 9 pages including cover, index and pp. 365-370.
Redact, e-mail from Paul Barber—dated May 3, 1996, pp. 1-2.
Computer Networks and ISDN Systems, (1995) Proceedings of the Third International World-Wide Web Conference, Darmstadt, Germany, The International Journal of Computer Band Telecommunications Networking, pp. 1-10.
A publication of Baker Library, Harvard Business School (1995), vol. 2, No. 5, http://members.verizon.net/~vze2vjb4/tw/tw2_5.txt. printed May 3, 2006, pp. 1-11.
Google search "java applet web monitoring", InfoTicker Java Applet, http://groups.google.com/group/comp/infosystems.www.announce/ browse_thread/thread/cc..., printed May 2, 2006, pp. 1-2.
ftp.ist.utl.pt screen shots of index of/pub/ftp/utilities/fwgstat,wwwstat, pp. 1-3.
Google search "Java applet hit counter" Can u make a hit counter in a java applet?, http://groups.google.com/group/comp.lang.java/ browse_thread/threadf2a41d0cb5c8eee4/c8..., printed on May 2, 2006, pp. 1-6.
Google Groups: Michael Rapp (1196) Counter, http://groups-beta. google.com/group/comp.lang.javascript/browse_thread/thread/ 487a9f9c..., printed on Jun. 8, 2005, pp. 1-4.
Peter G. Neumann, moderator (1996), Forum on Risks to the Public in Computers and Related Systems, ACM Committee on Computers and Public Policy, vol. 17, Issue 79, 11 pages.
Tomonari Kamba, et al., "The Krakatoa Chronicle—An Interactive, Personalized, Newspaper on the Web", 15 pages.
file://P:\P Drive Files\Clients\Nielsen-Netratings\Settled Cases\Sane Solutions, LLC\... Dec. 21, 2006, pp. 1-2.
Rick Knoblaugh (1991) IOMON—Protected mode I/O port monitor, Programmer's Journal, vol. 9 No. 5, 6 page.
Michael A. Abrams "A Tool to Aid in Model Development and Validation", Systems Engineering—Retail Division, NCR Corporation, Annual Simulation Symposium, pp. 1-10.
Tomonari Kamba, et al. "The Krakatoa Chronicle—An Interactive, Personalized, Newspaper on the Web", 15 pages.
Joseph K.W. Lee, et al. (1997) "Intelligent Agents for Matching Information Providers and Consumers on the World-Wide-Web", Department of Computer Science, The University of Hong Kong, 11 pages.
Ramon M. Feliciano, et al. "Lamprey: Tracking Users on the World Wide Web", Section on Medical Informatics, Stanford University, 5 pages.
GCN Apr. 29, 1996 issue, "They Could Be Monitoring Your Every Web Move", http://www.gcn.com, pp. 1-3.
Sun Wu, et al. (1997) "Virtual Proxy Servers for WWW and Intelligent Agents on the Internet", Department of Computer Science and Engineering National Chung Cheng University, IEEE, pp. 1-10.
Andrew Johnson, et al. (1993) "Automatic Touring in a Hypertext System", Wayne State University, Computer Science Department, IEEE, pp. 524-530.
John E. Toole (1985) "Performance Measurement and Evaluation of Online Information Systems", ACM Computer Science Conference—Agenda for Computing Research: The Challenge for Creativity,pp. 196-203.
Scott A. Gile (1990) "Reporting Application Usage in a LAN Environment" ACM, pp. 147-159.
NCSA Mosaic History (1993) In the beginning there was NCSA Mosaic . . . , htttp//:www.ncsa.uiuc.edu/news/mosaichistory/, pp. 1-15.
Jeffrey C. Mogul (1990) "Efficient Use of Workstations for Passive Monitoring of Local Area Networks", WRL Research Report 90/5, 32 pages.
Timothy Jason Shepard (1991) "TCP Packet Trace Analysis", Massachusetts Institute of Technology, Laboratory of Computer Science, pp. 1-68.

Debra Anderson, et al. (1994) Next Generation Intrusion Detection Expert System (NIDES) Software Users Manual, Beta Update Release, SRI International, pp. 1-301.

Marc Abrams, et al. (1995) "Multimedia Traffic Analysis Using CHITRA95", ACM Multimedia 95—Electronic Proceedings, pp. 1-17.

Steven McCanne, et al., (1992) "The BSD Packet Filter: A New Architecture for User-Level Packet Capture", Lawrence Berkeley Laboratory, pp. 1-11.

Stephen E. Hansen, et al. (1993) "Automated System Monitoring and Notification with Swatch", LISA, pp. 145-152.

tcpdump-dump traffic on a network, http://www.tcpdump.org/tcpdump_man.hml, printed on Jun. 12, 2006, pp. 1-26.

Gwstat v1.1—generate graphs of httpd server traffic, public release 1994, http://www.bubl.ac.uk///archive/internet/www/servers/hwstat6.htm, printed on Jun. 12, 2006. 1 page.

Garrett Blythe, et al. "Lynx Users Guide Version 2.3", http://www.cse.unsw.edu.au/help/doc/lynx/lynx_help/lynx_users_guide.html, pp. 1-12.

Jon Finke (1994) "Monitoring Usage of Workstations with a Relational Database", LISA, pp. 149-158.

Progressive Networks, Inc. (1995-1997) "RealServer Administration and Content Creation Guide Version 4", 366 pages.

Progressive Networks, Inc. (1995-1996) "RealAudio Server Administration and Content Creation Guide Version 3", 286 pages.

James E. Pitkow, et al. (1994) "Using the Web as a Survey Tool: Results from the Second WWW User Survey" Graphics, Visualization & Usability Center, College of Computing Georgia Institute of Technology,pp. 1-12.

Chen, et al. (1996) "Supporting Advertisement on Electronic Publications", IBM Technical Disclosure Bulletin, pp. 149-150.

Tracking Web Advertising (1995) "Audience Tracking System for Electronic Newspapers", Telegrafix Communications Inc. 3 pages.

Tracking Web Advertising (1996) Study Faults Online Ads for Kids, FTC Probes, Rueters, 3 pages.

Tracking Web Advertising (1996) "Advertising Models and Associated Software . . . " google search 5 pages.

Tracking Web Advertising (1996) "Goldmail Revolutionizes Internet Advertising!", google-search, 4 pages.

Tracking Web Advertising (1996) "Goldmail thinks consumers should get Paid for reading Advertising!", google search, 4 pages.

Google Search (1997) "Java Project, I am Volunteering My Time", Java Project, http://groups.google.com/group/comp.lang.java.programmer/brows_thread/thread/5430a3..., pp. 1-3.

James E. Pitkow, et al. (1994) "A Simple Yet Robust Caching Algorithm Based on Dynamic Access Patterns", Graphics, Visualization & Usability Center College of Computing,Georgia Institute of Technology, pp. 1-8.

James E. Pitkow, et al. Results from the first world-wide web user survey, Journal of Computer Networks and ISDN systems, vol. 27, No. 2, GVU Technical report, pp. 1-15.

Risks List: Risks-Forum Digest (1996), vol. 17, issue 83, pp. 1-11.

Glenn Fleishman, Web Log Analysis:Who's Doing What, When? Part 2/ web developer.com, pp. 1-4.

Hans-Werner Braun, et al. (1995) "Applied Network Research: 1994 Annual Status Report", Applied Network Research San Diego Supercomputer Center and University of California, pp. 1-15.

Peter Brueggeman, Monitoring CDROM Usage, UCSD Scripps Institution of Oceanography Library, pp. 1-5.

Azer Bestavros, et al. (1995) "Application-Level Document Caching in the Internet", In Proceedings of the Second Intl. Workshop on Services in Distributed and Networked Environments (SDNE 95), pp. 1-8.

T. Berners Lee, et al. (1994) "Uniform Resource Locators", 23 pages.

Marcia Bates, e al. (1989) "The Design of Browsing and Berrypicking Techniques for the Online Search Interface", Graduate School of Library and Information Science, University of California at Los Angeles, pp. 1-19.

John K. Ousterhout, et al. (1985) "A Trace Driven Analysis of the UNIX 4.2 BSD File System", Computer Science Division Electrical Engineering and Computer Sciences, University of California, pp. 1-29.

Steven Glassman "A Caching Relay for the World Wide Web", Systems research Center, Digital Equipo, pp.ment Corporation, pp. 1-10.

Anawat Chankhunyhod, et al. "A Hierarchical Internet Object Cache", Computer Science Department , Universities of S. California and Colorado, pp. 1-11.

Kimberly C. Claffy, et al. Traffic Characteristics of the NSFNET Backbone, National Science Foundation, Joint study agreement with IBM, pp. 1-11.

Mark Bernstein, et al. (1991) "Architectures for Volatile Hypertext", Hypertext 91 proceedings, pp. 243-260.

Matt's Script Archive:Book'em Dano (1996), pp. 1-2.

Prakash Baskaran (1996) Gamelan Who's Who More info, http://web.archive.org/web/19961027024909/www._gamelan.com/person.cgi?id=PB3, pp. 1.

Piyawadee Noi Sukavirilya, et al. 1992) "A Second Generation User Interface Design Environment: The Model and the Runtime Architecture", Graphics, Visualization & Usability Center, Georgia Institute of Technology, pp. 1-10.

RealWorks (1997) "Real System 5.0 Security Features VVhitepaper", 10 pages.

Web Authoring FAQ (2005), pp. 1-59.

RealServer Administration Guide Version 5.0 (1995-1997), real Networks, Inc., pp. 255 pages.

tcptrace homepage, http://www.tcptrace.org/, 1 page.

Robert Cooley, et al. "Web Mining:Information and Pattern Discovery on the World Wide Web", Department of Computer Science University of Minnesota, pp. 1-2.

Bamshad Mobasher (1997) Introduction, Next: A taxonomy of up: Web Mining: Information and Previous:Web Mining: Information and . . . , http://maya.cs.edpaul.edu/~mobasher/webminer/survey/node1.html, pp. 1-2.

Bamshad Mobasher (1997) A Taxonomy of Web Mining: Next: Web Content Mining Up: Web Mining: Information and Previous: Introduction, http://maya.cs.edpaul.edu/~mobasher/webminer/survey/node2.html, pp. 1.

Bamshad Mobasher (1997) Content Mining: Next: Agent-Based Approach Up: A Taxonomy of Previous: A taxonomy of, http://maya.cs.edpaul.edu/~mobasher/webminer/survey/node3.html, pp. 1.

Bamshad Mobasher (1997) Agent-Based Approach: Next Database Approach Up: Web Content Mining Previous: Web Content Mining, http://maya.cs.edpaul.edu/~mobasher/webminer/survey/node4.html, pp. 1-2.

Bamshad Mobasher (1997) Database Approach: Next: Web Usage Mining Up: Web Content Mining Previous: Agent-Based Approach, http://maya.cs.edpaul.edu/~mobasher/webminer/survey/node5.html, pp. 1-2.

Bamshad Mobasher (1997) Web Usage Mining: Next: Pattern Discovery Tools Up: A Taxonomy of Previous: Database Approach, http://maya.cs.edpaul.edu/~mobasher/webminer/survey/node6.html, pp. 1-2.

Bamshad Mobasher (1997) Pattern Discovery Tools: Next: Pattern Analysis Tools Up: Web Usage Mining Previous: Web Usage Mining, http://maya.cs.edpaul.edu/~mobasher/webminer/survey/node7.html, pp. 1.

Bamshad Mobasher (1997) Pattern Analysis Tools: Next: Pattern Discovery from Up: Web Usage Mining Previous: Pattern Discovery Tool, http://maya.cs.edpaul.edu/~mobasher/webminer/survey/node8.html, pp. 1.

Bamshad Mobasher (1997) Pattern Discovery from Web Transactions: Next: Preprocessing Tasks Up: Web Mining: Information and Previous: Pattern Analysis Tools, http://maya.cs.edpaule.edu/~mobasher/webminer/survey/node9.html, pp. 1.

Bamshad Mobasher (1997) Preprocessing Tasks, Next: Data Cleaning Up: Pattern Discovery from Previous: Pattern Discovery from . . . , http://maya.cs.edpaul.edu/~mobasher/webminer/survey/node10.html, pp. 1.

Bamshad Mobasher (1997) Data Cleaning, Next: Transaction Identification Up: Preprocessing Tasks, http://maya.cs.edpaul.edu/~mobasher/webminer/survey/node11.html, pp. 1.

Bamshad Mobasher (1997) Transaction Identification, Next: Discovery Techniques on Up: Preprocessing Tasks Previous: Data Cleaning, http://maya.cs.edpaul.edu/~mobasher/webminer/survey/node12.html, pp. 1-2.

Bamshad Mobasher (1997) Discovery Techniques in Web Transactions, Next: Path Analysis Up: Pattern Discovery from Previous: Transaction Identification, http://maya.cs.edpaul.edu/~mobasher/webminer/survey/node13.html, pp. 1.
Bamshad Mobasher (1997) Path Analysis: Next: Association Rules Up: Discovery Techniques on Previous: Discovery Techniques on . . . , http://maya.cs.edpaul.edu/~mobasher/webminer/survey/node14.html, pp. 1.
Bamshad Mobasher (1997) Association Rules, Next: Sequential Patterns Up: Discovery Techniques on Previous: Path Analysis, http://maya.cs.edpaul.edu/~mobasher/webminer/survey/node15.html, pp. 1.
Bamshad Mobasher (1997) Sequential Patterns, Next: Clustering and Classification Up: Discovery Techniques on Previous:L Association Rules, http://maya.cs.edpaul.edu/~mobasher/webminer/survey/node16.html, pp. 1.
Bamshad Mobasher (1997) Clustering and Classification, Next: Analysis of Discovered Up: Discovering Techniques on Previous: Sequential Patterns, http://maya.cs.edpaul.edu/~mobasher/webminer/survey/node17.html, pp. 1.
Bamshad Mobasher (1997) Analysis of Discovered Patterns, Next: Visualization Techniques Up: Web Mining: Information and Previous: Clustering and Classification, http://maya.cs.edpaul.edu/~mobasher/webminer/survey/node18.html, pp. 1.
Bamshad Mobasher (1997) Visualization Techniques, Next OLAP: Techniques Up: Analysis of Discovered Previous: Analysis of Discovered, http://maya.cs.edpaul.edu/~mobasher/webminer/survey/node19.html, pp. 1.
Bamshad Mobasher (1997) OLAP Techniques, Next: Data and Knowledge Up: Analysis of Discovered Previous: Visualization Techniques, http://maya.cs.edpaul.edu/~mobasher/webminer/survey/node20.html, pp. 1.
Bamshad Mobasher (1997) Data and Knowledge Querying, Next: Usability Analysis Up: Analysis of Discovered Previous: OLAP Techniques, http://maya.cs.edpaul.edu/~mobasher/webminer/survey/node21.html, pp. 1.
Bamshad Mobasher (1997) Usability Analysis, Next: Web Usage Mining Up: Analysis of Discovered Previous: Data and Knowledge, http://maya.cs.edpaul.edu/~mobasher/webminer/survey/node22.html, pp. 1.
Bamshad Mobasher (1997) Web Usage Mining Architecture, Next: Research Directions Up: Web Mining: Information and Previous: Usability Analysis, http://maya.cs.edpaul.edu/~mobasher/webminer/survey/node23.html, pp. 1-3.
Bamshad Mobasher (1997) Research Directions, Next: Data Pre-Processing for, Up: Web Mining: Information and Previous: Web Usage Mining, http://maya.cs.edpaul.edu/~mobasher/webminer/survey/node24.html, pp. 1.
Bamshad Mobasher (1997) Data Pre-Processing, Next: The Mining Process Up: Research Directions, Previous: Research Directions, http://maya.cs.edpaul.edu/~mobasher/webminer/survey/node25.html, pp. 1.
Bamshad Mobasher (1997) The Mining Process, Next: Analysis of Mined Up: Research Directions, Previous: Data Pre-Processing for . . . , http://maya.cs.edpaul.edu/~mobasher/webminer/survey/node26.html, pp. 1.
Bamshad Mobasher (1997) ANalysi of Mined Knowledge, Next: Conclusion Up: Research Directions, Previous: The Mining Process, http://maya.cs.edpaul.edu/~mobasher/webminer/survey/node27.html, pp. 1.
Bamshad Mobasher (1997) Conclusion, Next: References Up: Web Mining: Information and Previous: Analysis of Mined, http://maya.cs.edpaul.edu/~mobasher/webminer/survey/node29.html, pp. 1.
Bamshad Mobasher (1997) References, Next: About this Document Up: Web Mining: Information and Previous: Conclusion, http://maya.cs.edpaul.edu/~mobasher/webminer/survey/node29.html, pp. 1-6.
Bamshad Mobasher (1997) About This Document . . . , Up: Web Mining: Information and Previous: References, http://maya.cs.edpaul.edu/~mobasher/webminer/survey/node30.html, pp. 1.
Roy Flelding (2001) "wwwstat: HTTPd Logfile Analysis Software", Department of Information and Computer Science, University of California, http://ftp.ics.uci.edu/pub/websoft/wwwstat/, pp. 1-3.
Changes to wwwstat: HTTPd Logfile Analysis Package, http://ftp.ics.uci.edu/pub/websoft/wwwstat/changes, pp. 1-4.
wwwstat manual, wwwstat-summarize WWW server (httpd) access statistics, http://ftp.ics.uci.edu/pub/websoft/..wwwstat/wwwstat.html, pp. 1-11.
Tcpslice(8): extract pieces of/glue together . . . —Linux man page, htttp://www.die.net/doc/linux/man/man8/tcpslice.8.html, pp. 1-3.
Tcpslice-Linux Command-Unix Command, Focus on Linux, http://linux.about.com/library/cmd/blcmdl8_tcpslicxe.htm, pp. 1-3.
Paul Weiler, et al. (94) "Usability Lab Tools: One Year Later", CHI 94, Celebrating Independence, Conference Companion, p. 33.
Carlos R. Cunha, et al. (1995) "Charaeristics of WWW Client-Based Traces", Computer Science Department, Boston University, pp. 1-18.
Ann Lynworth (1995) "Tracking Home Page Hits, Reporting on user access" Dr. Dobb's Software Tools for the PRofessional Programmer, http://ddj.com/docuemnts/s=979/ddj9517d/, pp. 1-11.
Uni Kassel, FB16, Messtechnik Hompepage, Fachgebiet MeBtechnik, Univ.—Prof.Dr. rer. nat. Wolf—Jurgen Becker, p. 1.
Applets at Kassel, Applets and Applications, Department of Engineering Measurement, pp. 1-5.
Applets in Kassel, Applets und Applikationen, Fachgebiet MeBtechnik, pp. 1-5.
Gamelan Earthweb, Java Enhanced Communication tools, pp. 1-7.
Marc Wandschneider, Microsoft Corporation, (updated Apr. 1996) "ActiveX Controls Framework: Sample Code for Authoring Non-MFC Controls", http://msdn.microsoft.com/archive/en-us/dnaractivex/html/msdn_cntrlfmk.asp?frame=true. pp. 1-15.
Google search for Garrett Casey: Google Groups: comp.infosystems.www.authoring.cgi, pp. 1-2.
Google search for Garrett Casey Counter: Counter Service for WWW pages; Google groups: misc.entrepreneurs, pp. 1-3.
Dave Raggett, W3C Recommendation Jan. 14, 1997, HTML 3.2 Reference Specification, http://www.w3.org/TR/REC-html32, pp. 1-49.
T. Berners-Lee, et al., Network Working Group (1996) "Nypertext Transfer Protocol—HTTP/1.0", http://www.w3.org/Protocols/rfc1945/rfc1945, pp. 1-57.
Tomonari Kamba, et al. The Krakatoa chronicle—An Interactive, Personalized, Newspaper on the web, 15 pages.
Michael McGee (1996) Web pages: A Programmer's Perspective, http://www.dfpug.com/loseblattsammlung/migration/whitepapers/webpages.htm, pp. 1-13.
SunSITE, Software Information and Technology Exchange "Hot Java Read Me and link to the software on SunSITE", http://www,ibiblio.org/hotjava/, printed on May 24, 2006.
Tim Berners-Lee (1995) "Build a Web Site".
Shishir Gindavaram (1996) "CGI Programming on the World Wide Web".
Michael Girdley, et al. (1996) "Web Programming with Java".
Owen Davis, et al. (1996) "Instant Java Applets".
Jon A. Pew (1996) "Instant Java".
Patrick Naughton (1996) "Java Handbook: The Authoritative Guide to the Java Revolutionary".
Peter Kent, et al. (1996) "Official Netscape JavaScript Book".
John Rodley (1996) "Writing Java Applets".
Eugene Eric Kim (1996) "Master CGI Programming for the Iternet—CGI Developer's Guide".
Brian Wilson "OPERA" =Index DOT Html/Css by Brain Wilson=, http://www.blooberry.com/indexdo/history/opera.htm, printed on May 24, 2006, pp. 1-3.
David Beckett "Combined Log System", [1] Computing Laboratory, http://www.igd.fhg.de/archive/1995_www95/papers/46/comblog.html, printed on May 24, 2006, pp. 1-8.
Viktor Mayer-Schonberger, "The Internet and Privacy Legislation: Cookies for A Treat?", http://web.archive.org/web/19990203034203/www.wvjolt.wvu.edu/wjolt/current/issue1/articlaes/mayer/... printed on May 24, 2006, pp. 1-7.
Juston A Boyan (1995) Anonymous surfing "The Anonymizer Home Page", http://web.archive.org/web/19990208003332rm_1/anonymizer.cs.cmu.edu:8080/, printed on May 24, 2006, p. 1.
Gerald M. O'Connell (1995) "Advertising on the World Wide Web is a Whole New Ball game", Modem Media, http://web.archive.org/ web/19961111095738/www.modemmedia.com/clippings/articles/ne..., printed on Jun. 8, 2005, pp. 1-8.
John Nardone (1995) "The Modem Media Internet Research and Involvement Scale (IRIS)", Modem Media, http://web.archive.org/web/19961111095728/www.modemmedia.com/clippings/articles/iris..., printed on Jun. 8, 2005, pp. 1-3.
John Houston (1994) "A Vision of Advertising Technology—How It Will Work . . . ", Modem Media, http://web.archive.org/web/19961111095749/www.modemmedia.com/clippings/articles/sm... , printed on Jun. 8, 2005, pp. 1-6.
Screen Shots of Windows NT 3: 1, http://www.cs.umd.edu/hcil/musiseum/systems/winnt31src.html, printed on Jun. 7, 2005, pp. 1-4.
Aaron Johnson (2006) "Implementation Guide, HBX on Demand Web Analytics",WebSideStory Inc., pp. 1-15.
WebSideStory (2005) WebSideStory and AIG, screen shots, On Demand Web Analytics, pp. 1-10.
Counter, Feb. 9, 1996, pp. 1-33.
Google search "access counters", http://groups.google.com/group/comp.infosystems.www.authoring.html/browse_thread/dfb1a837f2e165e/aOeOe6a131c6102d?q=acces., printed May 24, 2006, pp. 1-3.
Logging Control in W3C httpd, generic statistics programs that analyze log file contents, http://www.w3.org/Daemon/User/Config/Logging.html, printed on May 24, 2006, pp. 1-3.
Netscape History, Mar. 1993 through Mar. 17, 2006; http://www.holgermetger.de/Netscape_Histry.html, printed on May 24, 2006, pp. 1-4.
Drew Dean, et al. (1995) "Security Flaws in the HotJava Web Browser", Dept. of Computer Science, Princeton University, pp. 1-8.
Scott Weston (1995) "Netscape 2.0b2 allows for invasion of privacy", http://www.tbtf.com/resource/b2-privacy-bug.html, printed on May 24, 2006, pp. 1-2.
Classic HTTP Documents (1995), http://www..w3.org/Protcols/Calssic.html, printed on May 24, 2006, p. 1.
Google search "javascript", http://groups.google.com/group/comp.society.privacr/browse_thread/thread/9b12496aeda7fd78/dd2ebe5f8966fd05?q=javascript&mum=1&hl..., printed on May 24, 2006, pp. 1-3.
Extended Log File Format W3C Working Draft WD-logfile-960323, http://www.w3.org/TR/WD-logfile.html, printed on May 24, 2006, pp. 1-6.
Computer Privacy Digest V8#024 (1996) "Computer Privacy Digest Moderator", http://web.archive.org/web/20000829051834/itu.rdg.ac.uk/misc/Mailing_Lists/cpd/00000002.htm, printed on May 24, 2006, pp. 1-19.
Google search "javascript exploit", http://groups.google.com/group/comp.sys.mac.misc/browse_thread/thread/f9285c7d4e4354cd/eb94d50669810159?q=javascript+exploit&mum... , printed on May 24, 2006. pp. 1-3.
Google search "javascript counter script", http://groups.google.com/group/comp.database.oracle/browse_thread/thread/97671e385d1bac94/777a82875e328555?q=javascript+counter+sc...printed on May 24, 2006, pp. 1-2.
Older Counter.html history, Older History of Changes. http://www.ualberta.ca/GEO/Counter.History.html, printed on May 24, 2006, pp. 1-8.
A Little History of the Word Wide Web (1945-1995), http://www..w3.org/History.html, printed on May 24, 2006, pp. 1-6.
Information Operations Timeline, 1200BC through Dec. 2003, http://www.jfsc.ndu.edu/schools_programs/jciws/iw/io_timeline.asp, printed on May 24, 2006, pp. 1-9.
Tim Berners-Lee, CERN (Mar. 1989 and May 1990) "Information Management: A Proposal", http://www.w3.org.History/1989.proposal.html, printed on May 24, 2006, pp. 1-14.
Google search "xferstats", http://groups.google.com/group/alt.sources/browse_thread/thread/c9e60d434be3ad86/0a180fb213f27e2b?q=xferstats&mum=199&hl=en. printed on May 24, 2006, pp. 1-10.
WorldWideWeb: Proposal for a HyperText Project, e-mail from T. Berners-Lee/CN, R. Cailliau/ECP to P.G. Innocenti/ECP, G. Kellner/ECP, D.O. Williams/CN. Nov. 12, 1990, pp. 1-7.
WorldWideWeb for C5. Presentation (1991), http://www.w3.org/Talks/C5_17_May_91.html, p. 1.
Change History for httpd, History List, http://www.w3.org/Daemon/Features.html, printed on May 24, 2006, pp. 1-15.
WWWTalk.1991 Archives Messages from Oct. 28, 1991 through Dec. 13, 1991, http://ksi.cpsu.ucalgary.ca/archives/WWW-TALK/www-talk-12991.index.html; printed on May 24, 2006, p. 1.
CERN Computer News Letter (Oct. through Dec. 1991), Ref: CERN-CNL-1991-204, vol. XXVI, Issue No. 3. http://ref.web.cern.ch/ref/CERN/CNL/1991/204/, printed on May 24, 2006, pp. 1-2.
HyperText Transfer Protocol Design Issues (1991), Design Decision, http://www.w3.org/Protocols/DesignIssues.html, printed on May 24, 2006, pp. 1-3.
An updated quick look at ViolaWWW, Review, http://www..w3.org/History/19921103-hypertext/hypertext/Viola/Review.html, printed on May 24, 2006, pp. 1-2.
Demos, http://www.w3.ord/Conferences/JENC92/Demonstrations.html, printed on May 24, 2006, p. 1.
The World Wide Web Project, http://www.w3.org/History/19921103-hypertextlhypertext/WWW/TheProject.html, printed on May 24, 2006, p. 1.
World-Wide Web Servers, W3 Servers, http://www.w3.org/History/19921103-hypertext/hypertext/DataSources/WWW/Services.html, printed on May 24, 2006, pp. 1-2.
Basic HTTP as defines in 1992, HTTP: A protocol for networked information, http://www.w3.org/Protocols/HTTP/HTTP2.html, printed on May 24, 2006, pp. 1-2.
An Early History of Lynx: Multidimensional Collaboration, http://people.cc.ku.edu/~grobe/early-lynx.html, printed May 24, 2006, pp. 1-8.
Joseph A Bank (1995) "Java Security," http://net.ai.mit.edu/~jbank/javapaper/javapaper.html.pp. 1-11.
World-Wide Web, Presentation of VWJW to Online Publishing 93, http://www.w3.org/Talks/OnlinePublishing93/Overview.html, printed on May 24, 2006, p. 1.
Commercialization of the Internet, Creation of the NSFnet, http://johnthomson.orgfj561/NSFcreate-4.html, printed on May 24, 2006, pp. 1-2.
Commercialization of the Internet, The beginning of commercialization of the NSFnet, http://johnthomson.org/j561/NSFcomm-5.html, printed on May 24, 2006, p. 1.
Commercialization of the Internet, Criticism of the NSFnet grows, http://johnthomson.org/j561/NSFcriticism-6.html, printed on May 24, 2006, p. 1.
Commercialzation of the Internet, The NSFnet starts to change their policy, http://johnthomson.org/j561/NSFpolicy-7html, printed on May 24, 2006, p. 1.
Commercialization of the Internet, Changes in NSF policy become law—The Internet is Commercialized, http://johnthomson.org/j561/NSFlaw-9.html, printed on May 24, 2006, pp. 1-2.
Ibiblio-history. prehistory through 2002, http://www.ibiblio.org/history/, printed on May 24, 2006. pp. 1-11.
The Third International World-Wide Web Conference,Technology, Tools and Applications. (Apr. 10-14, 1995). Darmstadt, Germany, http://www.igd.fhg.de/archive/1995_www95/, printed on May 24, 2006, p. 1.
HighBeam Research (Mar. 4, 1996) "Harris Computer Systems and Webster Network Strategies Announce Alliance to Offer WWW Monitoring Capabilities Through Firewalls", Business Wire, pp. 1-5.
Resonate (2005) Network Traffic Management, Database Traffic Management, 2 pages.
Bruce McKenzie, et al. (2001) "An Empirical Analysis of Web Page Revisitation," Department of Computer Science, University of Canterbury, 7 pages.
Richard A. McGrath (Oct. 1998) "The Tail-less Mouse", Computer Graphics World, vol. 11, 5 pages including pp. 117-118.
Paul Pallab (Aug. 1996) "Marketing on the Internet", Journal of Consumer Marketing, vol. 13 (4), pp. 27-39.
Martha K. Lobow (Aug. 1987) "An Engineer's Guide to Autocad", Industrial Engineering, vol. 19, 5 pages.
Tom Dellecave, Jr. (Mar. 1996) "The Net Effect", Sales and Marketing Management, 9 pages.

Sharon Zillmer (Jun. 1996) How to Make Your Web Ads Pay Off, vol. 101 (23); 4 pages.

"PC-Meter Tracks Computer Uses" (Oct. 2, 1995), Advertising Age, 4 pages.

J.F. Cove, et al. (1988) "Online Text Retrieval Via Browsing", Information Processing and Management, vol. 24, No. 1, pp. 31-37.

E. Caramel, et al. (1992) "Browsing in Hypertext: A Congnitive Study", IEEE Transactions on Systems, Man, and Cybernetics, vol. 22, No. 5, pp. 865-883.

G. Marchionni (1989) "Information Seeking Strategies", Journal of the American Society for Information Science, vol. 10 (1), pp. 54-66.

Google Groups: comp.unix.xenix (Google search for xferstats), http://groups.google.comlgroup/comp.unix.xenix/browse_thread/thread/cb3d1aed21bc0e3e/8d9ce54693afge98?q=xferstats&mum=200... printed on May 24, 2006, pp. 1-3.

Tim Berners-Lee, The World Wide Web Browser, http://www.w3.org/People/Berners-Lee/WorldWideWeb.html, printed on May 24, 2006, pp. 1-2.

Yahoo! Search, Web programming>Access Counters in the Yahoo! Directory, http://dir.yahoo.com/Computers_and_Internet/Internet/World_Wide_Web/Programming/Access_Counters/, printed on May 24, 2006, pp. 1-3.

NetAcuity IP Intelligence Whitepaper, "The Role of IP Intelligence in the Online World", Digital Envoy, 2002-2003, pp. 1-10.

Lara D. Catledge, et al. Characterizing Browsing Strategies in the World Wide Web, The Third International/WWW Conference, 1995, pp. 1-9.

Carlos R. Cunha, et al. (1995) "Characteristics of WWW Client Based Traces", Computer Science Department, Boston University, pp. 1-18.

James Staten (1996) "Navigator Tricks Raise Concerns" MacWeek, vol. 10, No. 11, pp. 18(2).

Saul Greenberg, (1988) "Using Unix: Collected Traces of 168 Users", Advanced Technologies, The Alberta Research Council, pp. 1-13.

David M. Hilbert, et al. (1988) "Agents for Collecting Application Usage Data Over The Internet", Department of Information and Computer Science, University of California, 9 pages.

Louis Desjardins (1994) "Activity Monitor 1.1, User's Guide", 5 pages.

James E. Pitkow, et al., (1996) "Results From The Third WWW User Survey", Graphics, Visualization & Usability (GVU) Center, pp. 1-10.

Ariel Poler, Internet Profiles Corporation, "Improving WWW Marketing Through User Information and Non-Intrusive Communications", PC Data Inc., Nov. 16, 2000, pp. 1-4.

Rodney Fuller, et al. (2000) "Measuring User Motivation From Server Log Files", http://www.microsoft.com/usability/webconf/fuller/fuller.htm, PC Data Inc., pp. 2-16.

Mark E. Crovella, et al. (1995) "Explaining World Wide Web Traffic Self-Similarity", Computer Science Department, Boston University, Technical Report, pp. 1-19.

The HomeNet Project (1995) "Homenet: A Field Trial of Residential Internet Services" http://homenet.hcii.cs.cmu.edu/progress/report1.html, pp. 1-12.

Robert Kraut, et al., (1996) "HomeNet: A Field Trial of Residential Internet Services", http://www.acm.org/sigchi/chi96/proceedings/papers/kraut/rek_txt.htm, pp. 1-14.

Antonio C. Siochi, et al. (1991) "Computer Analysis of User Interfaces Based on Repetition in Transcripts of User Session", ACM Transactions on Information System, vol. 9, No. 4, pp. 309-335.

Gary Perlman (1989) "Asynchronous Design/Evaluation Methods for Hypertext Technology Development", Department of Computer and Information Science, Hypertext 89 Proceedings pp. 62-81.

Michael Bieber, et al. (1994) "Backtracking in a Multiple-Window Hypertext Environment", Institute for Integrated Systems Research, ECHT 1994 Proceedings, pp. 158-166.

Counter, Program Counter, retrieved from archive.org for Aug. 2, 1997, URL http://web.archive.org/web/19970802020140/www.uni-kassel.de/fb16/ipm/mt/java/counteru.html on May 24, 2006, 1 page.

* cited by examiner

US 8,271,778 B1

SYSTEM AND METHOD FOR MONITORING SECURE DATA ON A NETWORK

FIELD OF THE INVENTION

The present invention pertains to the field of monitoring systems. More specifically, the present invention pertains to the field of monitoring systems for secure data transfers on a network such as the Internet.

BACKGROUND OF THE INVENTION

Secure data transfers over computer networks are an important component of electronic commerce. Business transactions between parties from around the world can now occur safely within seconds largely due to the security and reliability that secure data transfers offer. Furthermore, as electronic commerce continues to grow as a part of the world economy, the importance of secure data transfers will continue to increase as well.

By analyzing a representative portion of the secure data transfers that take place on a network such as the Internet, businesses may be given reliable data on the preferences of users, the popularity of certain products, and other valuable information. The data obtained from this analysis can then be used by businesses to plan advertising and marketing campaigns, as well as to help guide future product development and electronic commerce initiatives. Therefore, understanding the purchasing patterns of users engaging in electronic commerce may be very beneficial for many businesses.

An important protocol involved in secure data transfers is the secure sockets layer protocol (SSL). SSL enables private documents to be securely transmitted across public networks such as the Internet by utilizing a public key to encrypt data. The SSL protocol is often used in electronic commerce as a way to safely transmit private user information necessary to complete a transaction, such as the user's billing address and credit card number. The address of web pages utilizing the SSL protocol often begins with "HTTPS", which stands for HyperText Transfer Protocol Secure.

Existing methods of analyzing HTTPS web pages that a user visits on the Internet have only been able to capture the Universal Resource Locator (URL), or address, of the web page. These prior art designs have not been able to capture the actual content of the web page, or data that the user submits.

Accordingly, it is desirable to have a system and method for monitoring secure data (e.g., HTTPS web pages) on a network (e.g., the Internet) that overcomes the above deficiencies associated with the prior art.

SUMMARY

One aspect of an exemplary embodiment provides a network monitoring system including a network for storing secure digital data. The network monitoring system may also include a network device in communication with a user and the network. Additionally, a server may be in communication with the network, and a browser and monitoring program may interface and be stored in the network device. The network device may receive the secure digital data from the network, and the browser may convert the secure digital data or a portion thereof into source data. Further, the monitoring program may transfer the source data or a portion thereof to the server.

Another aspect of an exemplary embodiment provides a method for monitoring a network storing secure digital data. The method may include transferring the secure digital data from the network to a network device, converting the secure digital data into source data, and forwarding the source data or a portion thereof to a server.

Yet another aspect of an exemplary embodiment may be a monitoring program running on a network device. The monitoring program may include a service component, and an interface program may communicate with the service component and a browser. The network device may receive secure digital data from a network, and the browser may convert the secure digital data into source data. Further, the interface program may enable the service component to access the source data.

DETAILED DESCRIPTION

Figure 1:
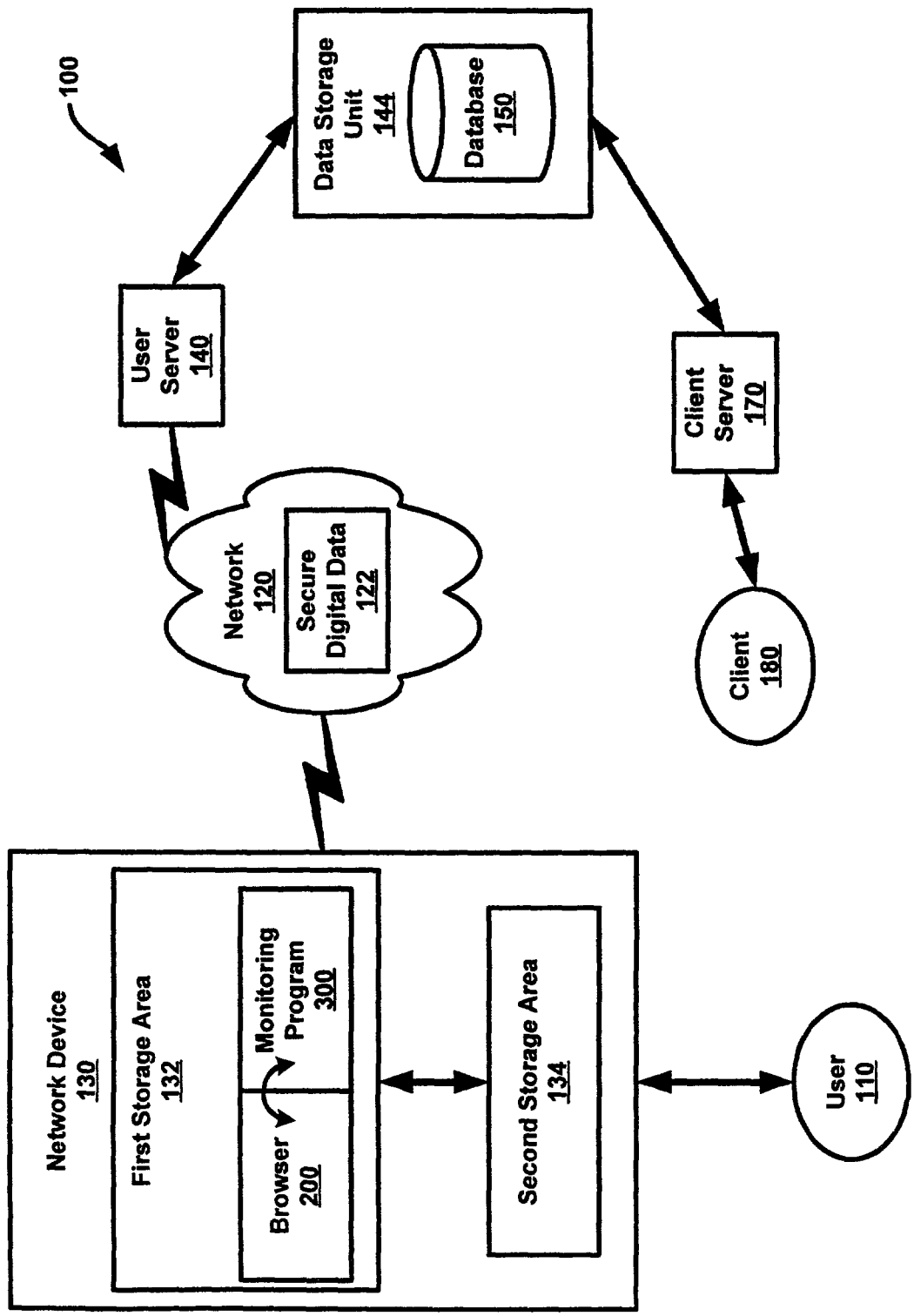
FIG. 1 is a block diagram illustrating an exemplary network monitoring system.

Turning now to the drawings, FIG. 1 shows an exemplary network monitoring system 100. The network monitoring system 100 may include a user 110 connected to a network 120 through a network device 130. The network monitoring system 100 may further have a data storage unit 144 connected to the network 120 through a user server 140, and a client 180 connected to the data storage unit 144 through a client server 170. The data storage unit 144 may further include a database 150. All components within the monitoring system 100 may be connected to one another via dial-up, wireless, and/or broadband connections. Examples of broadband connections that may be used with the monitoring system 100 include Digital Subscriber Line (DSL), satellite, Trunk Level 1 (T1), Systems Management Server (SMS), cable modem, Ethernet, or Integrated Services Digital Network (ISDN) connections. Examples of wireless connections that may be utilized with the monitoring system 100 include Cellular Digital Packet Data (CDPD), Global System for Mobile Communications (GSM), wireless LAN, and radio frequency (e.g., Bluetooth) connections. It should be understood that any number of different connection mechanisms not described here may also be utilized with the present embodiment, depending on consumer and/or manufacturing preferences.

In the present embodiment, the user 110 is a person utilizing the network device 130. However, it should be understood that alternatively, the user 110 may be another electronic device (e.g., portable computer or cellular phone) in communication with the network device 130. Furthermore, it should be understood that although only one user 110 is shown in FIG. 1, the network monitoring system 100 may have any number of users. In an exemplary scenario, a group of twenty-five thousand (25,000) users may utilize the network monitoring system 100. Two thousand (2000) of the users may be chosen by telephone through random digit dialing, and the remainder may be chosen via Internet recruiting. The users chosen by telephone may insure the demographic accuracy and projectability of the users chosen via Internet recruiting. Of course, the number of users and the method of recruiting the users may vary in alternate embodiments.

In the exemplary embodiment of FIG. 1, the network 120 is the Internet, but alternatively, the network 120 may be chosen from a wide variety of network types or a combination of network types. For example, in an alternate embodiment, the network 120 may be a combination of a corporate local area network (LAN) and a wide area network (WAN).

In addition, the network 120 may store secure digital data 122. The secure digital data 122 may include any number of secure data formats, such as HTTPS web pages written in HyperText Markup Language (HTML) and encoded within the SSL protocol, or HTML web pages encoded in Secure HTTP (S-HTTP). Additionally, the network 120 may also store other data that may or may not be secure, such as standard HTML web pages, Active-X controls, Graphics Interchange Format (GIF) files, and any number of other data file types.

The network device 130 shown in FIG. 1 may be a personal computer that preferably has at least one input device (e.g., mouse, keyboard, etc.) and utilizes an operating system, such as Windows NT manufactured by Microsoft Corporation (Redmond, Wash.). Alternatively, the network device 130 may be any type of device capable of communicating with the network 120, such as a hand-held computer, laptop computer, computer workstation, cellular phone, or facsimile device. It should be understood that the network device 130 may have different software and hardware components in alternate embodiments, and the description of commercial devices provided here is merely exemplary.

Additionally, the network device 130 may include a first storage area 132 and a second storage area 134. The first storage area 132 may be a non-volatile memory (e.g., static random access memory (SRAM)) that stores a browser 200 and monitoring program 300 that interface with one another. However, any other mechanism for storing data may also be used for the first storage area 132, such as a magnetic hard disk drive, buffer, flash memory, or dynamic random access memory (DRAM). The first storage area 132 may also include any possible combination of different storage mechanisms, such as a combination of a DRAM, a SRAM, and a buffer.

The second storage area 134 of the network device 130 is preferably a magnetic hard disk drive, but alternatively may include any mechanism known in the art for storing data (e.g., DRAM, SRAM, buffer, flash memory, etc.). Similar to the first storage area 132, the second storage area 134 may also include a combination of different storage mechanisms. In alternate embodiments, the network device 130 may have more or fewer storage areas and the browser 200 and monitoring program 300 may be stored in different storage areas.

Turning now to the user server 140 and client server 170, a wide variety of commercial servers (e.g., database servers) may be used for these devices. For example, the user server 140 may be a Solaris server manufactured by Sun Microsystems, Inc. (Palo Alto, Calif.) and the client server 170 may be a Windows NT server manufactured by Microsoft Corporation. The data storage unit 144 may be any type of storage unit known in the art (e.g., magnetic hard disk drive, flash memory, magnetic tape, etc.). The database 150 of the present embodiment may be a relational database, or any other data managing and/or storing unit known in the art. For example, the database 150 may be an Oracle 9i relational database manufactured by Oracle Corporation (Redwood Shores, Calif.). Of course, any number of other devices may be used for the user server 140, the client server 170, the data storage unit 144, and/or the database 150.

In addition, although the user server 140 and the database 150 are shown to be separate components in the exemplary embodiment shown in FIG. 1, alternatively, the database 150 may be integral with the user server 140 and encased within the same housing. Similarly, the database 150 may be integral with the client server 170 and encased within the same housing, or the database 150 may be split into two separate databases (e.g., a client and user database), each storing different data. Furthermore, it should be understood that the user server 140 and the client server 170 may be combined into a single server, or that multiple user servers and client servers may be utilized depending on the number of users and clients accessing the network monitoring system 100.

The client 180 in FIG. 1 may be a person utilizing a network device in order to access the client server 170, but alternatively, the client 180 may be any type of electronic device capable of communicating with the client server 170 (e.g., a computing workstation that is part of a corporate LAN). Further, although only one client 180 is shown in FIG. 1, any number of clients may be part of the network monitoring system 100.

Figure 2:
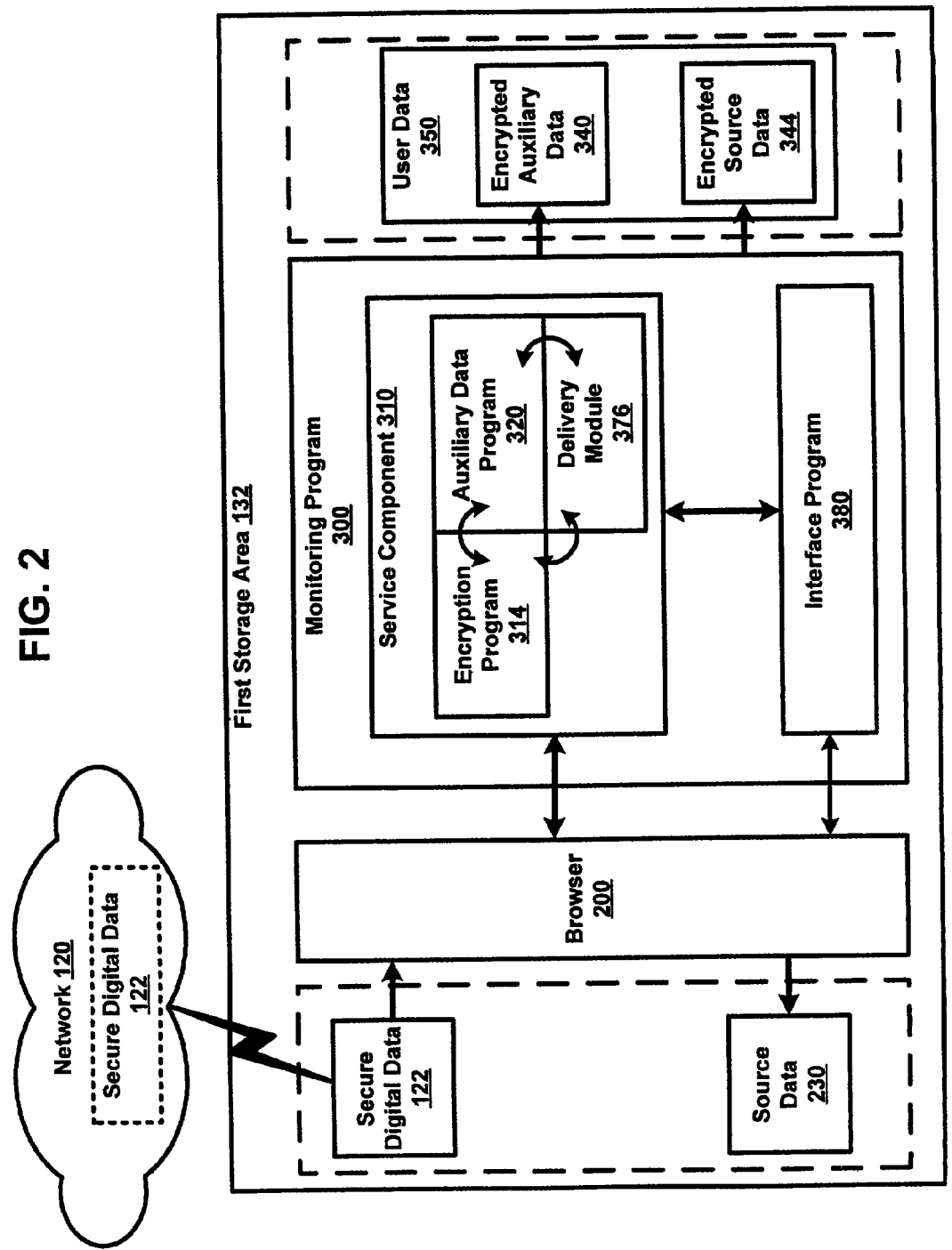
FIG. 2 is a block diagram illustrating an exemplary first storage area of the network monitoring system of FIG. 1.

Turning now to FIG. 2, the exemplary first storage area 132 is shown in greater detail. In the present embodiment, the first storage area 132 stores a browser 200 and a monitoring program 300. The first storage area 132 may also store different types of data, including secure digital data 122 received from the network 120, source data 230, encrypted auxiliary data 340, and encrypted source data 344. The encrypted auxiliary data 340 and the encrypted source data 344 may be collectively referred to as user data 350.

The browser 200 may be a graphics-based program that requests and retrieves data from a network such as the Internet. The browser 200 may be chosen from a wide variety of commercially available browsers, such as Internet Explorer 6.X (e.g., versions 6.0, 6.01, 6.1, etc.) manufactured by Microsoft Corporation or Navigator 4.X (e.g., versions 4.0, 4.01, etc.) manufactured by Netscape Communications Corporation (Mountain View, Calif.). The browser 200 may have a cache, where a number of previously viewed web pages and URLs may be stored. Additionally, the browser 200 may be capable of converting the secure digital data 122 (e.g., a web page encoded within the SSL protocol) into the source data 230 (e.g., a standard HTML web page that is not encrypted). Thus, the source data 230 is preferably a decrypted version of the secure digital data 122. Most commercially available browsers can convert the secure digital data 122 into the source data 230, since this is typically necessary to make secure web pages viewable. It should be understood that a wide variety of browsers not specified here may also be used with the present embodiment. It should be further understood that various non-browser applications, such as I-Seek-You (ICQ), may also be utilized with the present embodiment.

The monitoring program 300 may also include a service component 310 and an interface program 380, both of which may communicate with the browser 200. In the present embodiment, the browser 200 and the monitoring program 300 both may be computer programs written in a programming language, such as C++ or JAVA. Thus, the method of communication between the monitoring program 300 and the browser 200 may be software-based. Of course, this method of communication may be dependent on the type of network device 130 used. Furthermore, the browser 200 and monitoring program 300 alternatively may be combined into one program, or implemented as hardware components.

The service component 310 may further include an encryption program 314, an auxiliary data program 320, and a delivery module 376, all of which may be plug-ins to the monitoring program 300 or another program within the monitoring system 100. As shown in FIG. 2, the encryption program 314 may encrypt data (e.g., the source data 230) that is sent from the network device 130 to the user server 140. The encryption program 314 may utilize a wide variety of encryption algorithms, such as the Blowfish algorithm.

For more information on the Blowfish algorithm, one can refer to the paper "Description of a New Variable-Length Key, 64-Bit Block Cipher (Blowfish)" by B. Schneier (Fast Software Encryption, Cambridge Security Workshop Proceedings, December 1993, Springer-Verlag, 1994, pp. 191-204), the contents of which are incorporated in its entirety herein by reference.

Figure 3:
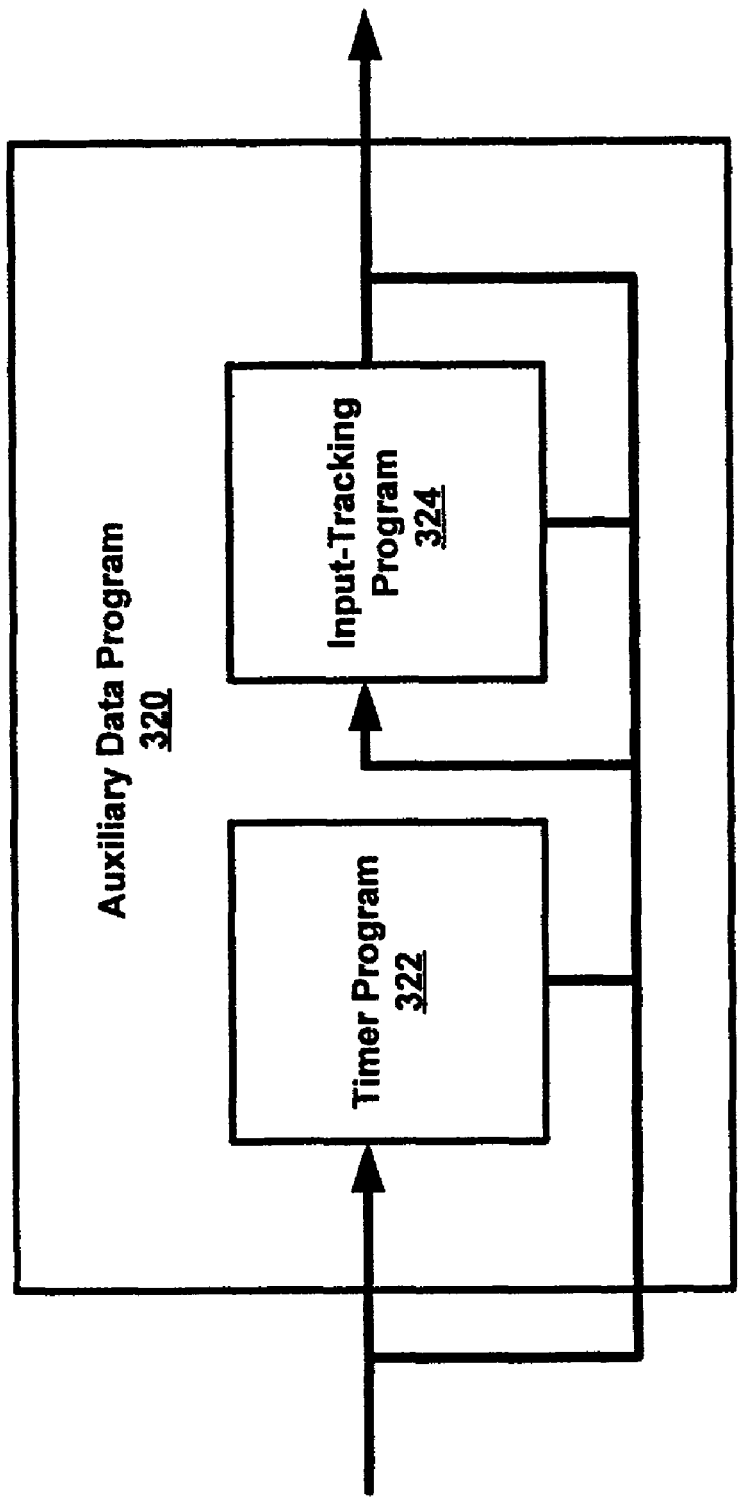
FIG. 3 is a block diagram of an exemplary auxiliary data program of the first storage area of FIG. 2.

FIG. 3 shows the components of the exemplary auxiliary data program 320 in more detail. The auxiliary data program 320 may include a timer program 322 and an input-tracking program 324.

The timer program 322 may calculate timer data (not shown), including the amount of time a web page takes to download, and the amount of time the user 110 has accessed a web page. The timer program 322 may calculate the timer data by accessing a system clock, which is standard on most operating systems. For example, in order to calculate the amount of time a user views a web page, the timer program 322 may begin counting when the web page is first loaded, and stop counting when the user loads a different web page.

The network device 130 may have any number of input devices, such as a mouse, keyboard, or joystick. The input-tracking program 324 shown in FIG. 3 preferably determines input-tracking data (not shown), which may include positions of the cursor moved by the mouse, locations where the mouse is clicked, keystrokes typed on a keyboard, and position and orientation of a joystick. The input-tracking program 324 may determine the input-tracking data by monitoring interrupts that an input device initiates on the operating system, and by reading data about the input device that is available to the operating system.

In the present embodiment, auxiliary data (not shown) may include the timer data, and input-tracking data. Preferably, the encryption program 314 converts the auxiliary data to the encrypted auxiliary data 340, which may be transferred from the monitoring program 300 to the user server 140 across the network 120.

It should be understood that any number of other programs may be part of the auxiliary data program 320, and the description of the timer program 322, and input-tracking program 324 merely illustrates an exemplary embodiment. Likewise, the auxiliary data 340 may include different data than described in this exemplary embodiment, depending on the types of programs that are part of the auxiliary data program 320. For example, in an alternate embodiment, the auxiliary data program 320 may include an advertisement-tracking program for tracking advertisements and banners viewed by the user 110.

The delivery module 376 shown in FIG. 2 preferably sends the user data 350 from the network device 130 to the user server 140 using a data delivery module (e.g., Ethernet driver, modem driver, etc.). It should be understood that the delivery module 376 may also include a proxy (not shown), or a proxy may be separate program within the service component 310. In such an embodiment, proxy settings within the browser 200 and/or the operating system may be adjusted so that the proxy accesses standard HTTP web pages before the browser 200, but HTTPS web pages bypass the proxy and are accessed first by the browser 200. For more information on proxy servers, one can refer to U.S. Pat. No. 5,864,852, the contents of which are incorporated in its entirety herein by reference.

In a first exemplary embodiment, the interface program 380 shown in FIG. 2 is a Component Object Model (COM) object. COM is a specification that enables programs to communicate via objects. Since the browser 200 is preferably a COM-compliant program, such as Internet Explorer 6.X manufactured by Microsoft Corporation, and the monitoring program 300 is also preferably a COM-compliant program, the two programs can communicate via the interface program 380. In this first exemplary embodiment, the interface program 380 may be stored in the address space of the browser 200 and may interface with a browser control interface (e.g., the IWebBrowser2 Interface within the WebBrowser Control in Internet Explorer 6.X). Thus, the interface program 380 may communicate with a running instance of the browser 200 under the COM specification. The contents of the COM specification are hereby incorporated in their entirety herein by reference.

In the present embodiment, the interface program 380 may be called every time the browser 200 requests a secure web page (e.g., secure digital data 122). A standard COM command may be used for this purpose, such as "OnDownloadBegin( )", "On DownloadComplete( )", or "OnDocumentComplete( )". Also, the interface program 380 may be able to access the source data 230 and request that the source data 230 is saved to the second storage area 134. It should be noted that the COM commands and browser-specific controls described in the present disclosure are merely exemplary, and that numerous other commands and control schemes may be utilized.

Turning now to a second exemplary embodiment, the interface program 380 may be a Dynamic Data Exchange (DDE) program. DDE provides a method of communication between computer programs. In the present embodiment, the browser 200 may support DDE, such as Navigator 4.X manufactured by Netscape Corporation, though other browsers and/or network programs may also be utilized.

In the present embodiment, the monitoring program 300 may also support DDE. Thus, the interface program 380 (e.g., DDE program) may interface with a running instance of the browser 200 and the monitoring program 300 using DDE. As in the previous embodiments, the interface program 380 will preferably be called every time the browser 200 requests a secure web page (e.g., secure digital data 122). This may be accomplished by a DDE command such as "EchoURL( )". Also, the interface program 380 will preferably be able to access the source data 230 and request that the source data 230 is saved to the second storage area 134. The DDE command "OpenURL( )" may be used for this purpose. In alternate embodiments, different DDE commands may be utilized with the present embodiment. The contents of the DDE specification are hereby incorporated in their entirety herein by reference.

It should be understood that in alternate embodiments, the interface program 380 may be a separate program in communication with the monitoring program 300. Furthermore, the use of a COM object and DDE program as the interface program 380 in the first and second exemplary embodiments, respectively, does not preclude the use of other types or combinations of interface programs.

Figure 4:
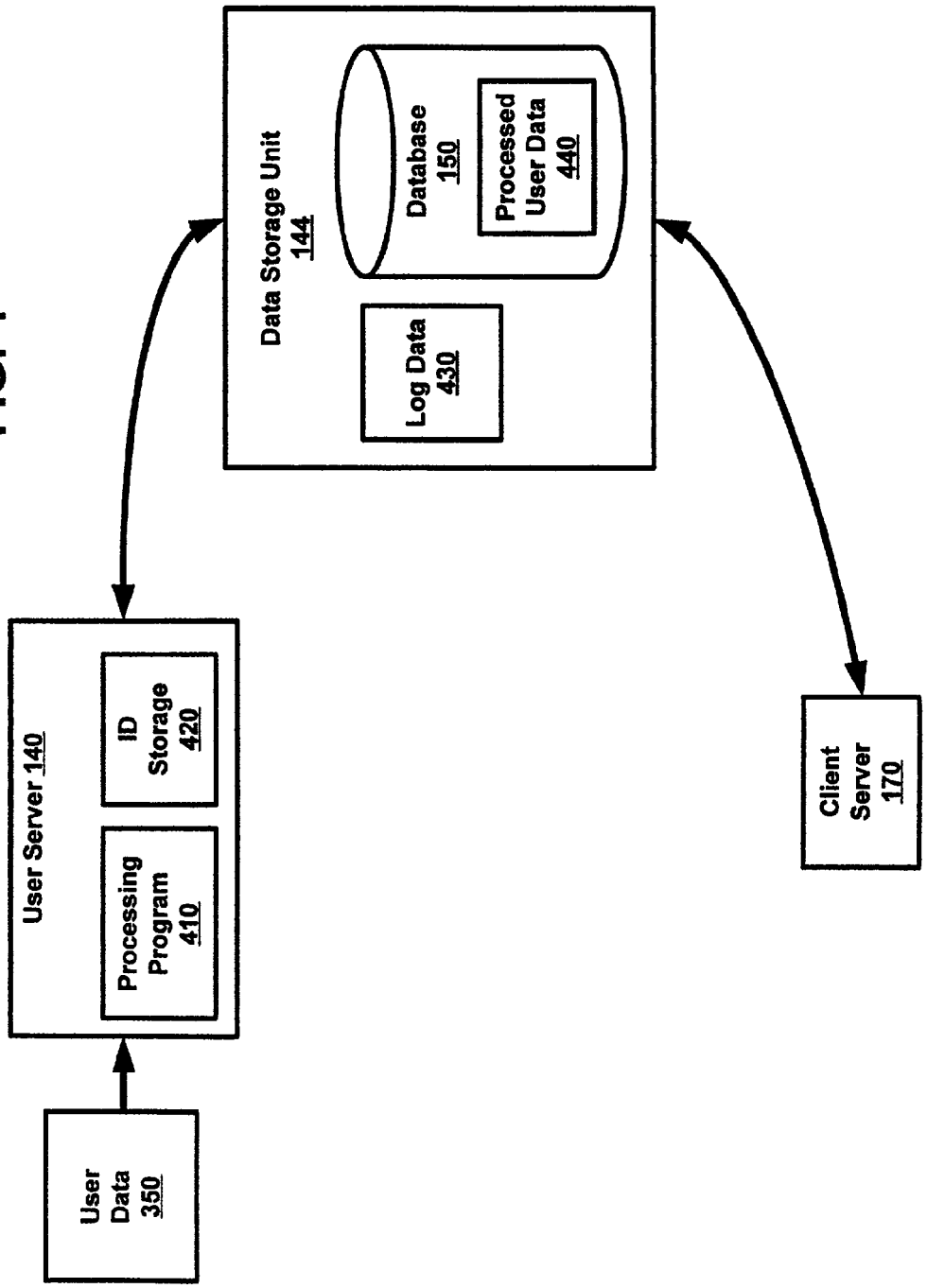
FIG. 4 is a block diagram of an exemplary user server, data storage unit, and client server of the network monitoring system of FIG. 1.

Turning now to FIG. 4, the user server 140, data storage unit 144, database 150, and client server 170 are shown in more detail. The user server 140 may receive the user data 350, and the user server 140 may include a processing program 410 and ID storage 420. Additionally, the data storage unit 144 may include log data 430 and the database 150 may store processed user data 440. The user data 350 may be filtered by the monitoring system 300 before being sent to the user server 140, so that user-sensitive information (e.g., user's credit card account number and billing address) may be removed.

Once the user data 350 reaches the user server 140, the processing program 410 may decrypt the user data 350 by utilizing the previously mentioned Blowfish algorithm or any other encryption algorithm. The earlier cited reference for the Blowfish algorithm provides information on this encryption/decryption technique.

Typically, most secure web pages have a content-type ID field that identifies the format of the web page. After decrypting the user data 350, the content-type ID field associated with the user data 350 may be compared to content-type ID fields contained within the ID storage 420. In the present embodiment, the ID storage 420 may be a non-volatile memory (e.g., magnetic hard disk drive or SRAM), but any mechanism for storing data may be utilized. Further, more than one content-type ID field may be used to describe the format of a web page in alternate embodiments.

If the content-type ID field of the user data 350 matches a content-type ID field stored within the ID storage 420, the format of the user data 350 may be determined. Subsequently, information contained within the user data 350, such as transaction-related parameters (e.g., the type and price of a transaction, name of vendor, etc.), may then be extracted in the form of the log data 430. User sensitive information, such as credit card information and billing address information, may also be filtered from the user data 350 by the processing program 410 (e.g., if not already done so by the monitoring program 300) so that such information is excluded from the log data 430.

Once the log data 430 is determined, the processing program 410 may parse every item within the log data 430 in order to create processed user data 440. The processed user data 440 may then be stored on the database 150. Furthermore, the log data 430 may be stored in files on the data storage unit 144 outside of the database 150. Additional processing of the log data 430 and/or processed user data 440 may be performed in accordance with consumer and/or manufacturing preferences.

Furthermore, the client server 170 may enable the client 180 to access the processed user data 440 stored on the database 150. Alternatively, the client 180 may also obtain access to the log data 430. It should be understood that the log data 430 and/or the processed user data 440 may undergo different processing techniques in alternate embodiments, and that the form of the data available to the client 180 may vary. Additionally, in an alternate embodiment, the database 150 may include a plurality of databases that are connected together. For example, in one such embodiment, the log data 430 may be stored on a first database, and the processed user data 440 may be stored on a second database.

Figure 5:
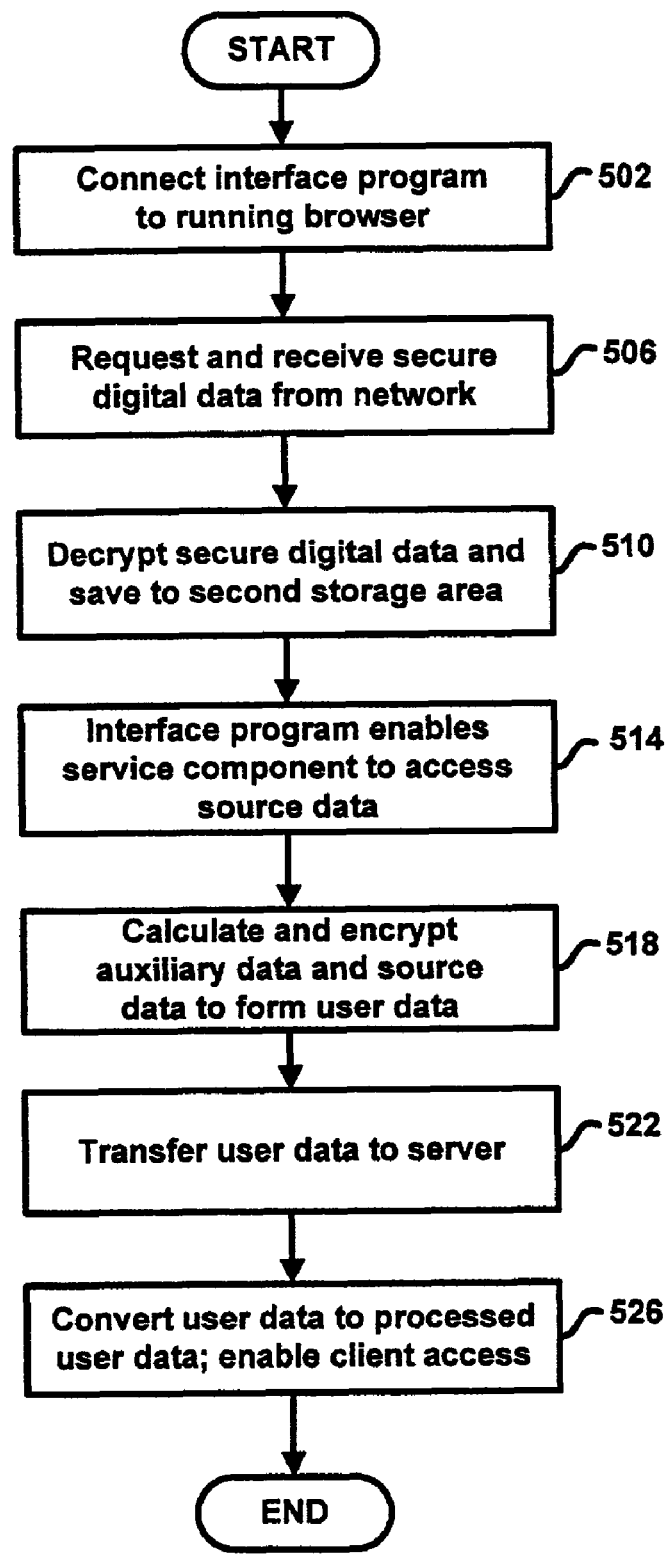
FIG. 5 is a flow chart of an exemplary first and second method of the network monitoring system of FIGS. 1 and 2.

Having described the structure and connectivity of the exemplary network monitoring system 100, a first and second exemplary method may now be discussed, as shown in FIG. 5. The first exemplary method uses the first exemplary embodiment of the interface object 380 discussed previously (i.e., the COM object). The second exemplary method uses the second exemplary embodiment of the interface object 380 discussed previously (i.e., the DDE program). For the sake of brevity and clarity, the first and second exemplary methods will now be discussed simultaneously, with the preferred differences between the two methods specifically noted.

In step 502, the interface program 380 may connect with the browser 200, which may be running on the network device 130. As described earlier, this may be accomplished by registering the interface program 380 with the browser 200 and/or loading the interface program 380 into the address space of the browser 200. In the first exemplary method, the connection between the interface program 380 and the browser 200 may occur under the COM specification. In the second exemplary method, the connection between the interface program 380 and the browser 200 may occur using DDE.

In step 506, a request for the secure digital data 122 may be passed from the browser 200 to the network 120, and the browser 200 may call the interface program 380. In the present embodiment, the interface program 380 may be called every time the browser 200 requests a secure web page (e.g., secure digital data 122) from the network 120. The secure digital data 122 may then be downloaded to the first storage area 132 from the network 120.

In step 510, the browser 200 may decrypt the secure digital data 122 (e.g., HTTPS web page) into source data 230 (e.g., a standard HTTP web page). Further, in the first exemplary method, the monitoring program 300 and/or interface program 380 may issue one or more COM commands (e.g., get_Document( ), get_body( ) and/or get_outerHTML( ) to the browser 200 in order to retrieve and access the source data 230. After the monitoring program 300 and/or interface program 380 receive access to the source data 230, the source data 230 may be saved to the second storage area 134. It should be understood that any number and type of COM retrieval commands may be utilized in the present step.

In step 510 of the second exemplary method, the interface program 380 may retrieve and save the source data 230 using DDE. The interface program 380 may ask the browser 200 to reload the secure digital data 122 into a new graphical window behind the graphical window the user sees through a DDE command such as OpenURL( ). Each URL link within the secure digital data 122 may then be individually reloaded from the network 120 or from a cache located on the browser 200. Any number of the URL links within the secure digital data 122 may then be converted to source data 230, and the source data 230 may be subsequently saved to the second storage area 134.

In both the first and the second methods of step 510, the second storage area 134 may be a magnetic hard disk drive. By saving the source data 230 to the second storage area 134, the monitoring program 300 may access the source data 230 for a longer period of time, since the second storage area 134 may provide a longer storage time than the first storage area 132 (e.g., SRAM).

In step 514, the interface program 380 may enable the service component 310 to access the source data 230. A pointer to the source data 230 stored on the second storage area 134 may be passed from the interface program 380 to the service component 310. Alternatively, the interface program 380 may utilize shared memory or file mapping to enable the service component 310 to access the source data 230 while it is in the first storage area 132 or on another storage device (e.g., magnetic hard disk drive). The mechanisms for sharing memory may be specific to the operating system utilized within the network device 130.

In step 518, the auxiliary data program 320 may calculate the auxiliary data, and the encryption program 314 may convert the auxiliary data into encrypted auxiliary data 340. Further, the source data 230 may also be converted into encrypted source data 344. Thus, as shown in FIG. 2, the user data 350 may be formed, including the encrypted auxiliary data 340 and the encrypted source data 344.

In step 522, a copy of the user data 350 may be transferred to the user server 140, and the user data 350 may be deleted from the second storage area 134. Alternatively, if the connection to the network 120 is not operable, the user data 350 may be retained on the second storage area 134 for a period of time until the network connection is restored.

In step 526, the user data 350 may be converted to processed user data 440 by the processing program 410. The client 180 may then access the processed user data 440 on the database 150 through the client server 170. The client 180 may have to supply an identification and password in order to access the processed user data 440, but this may vary depending on consumer and/or manufacturing preferences.

Figure 6:
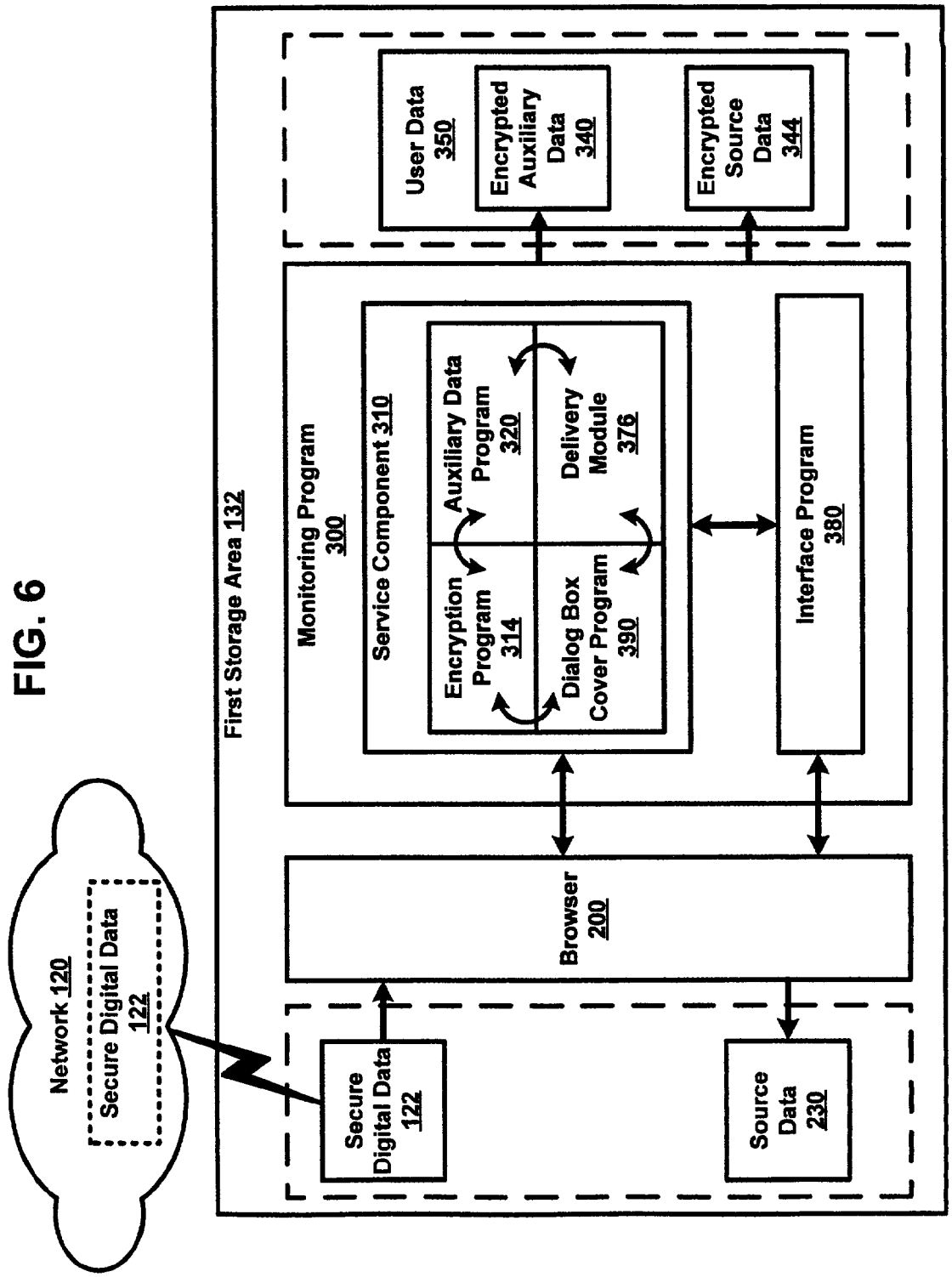
FIG. 6 is a block diagram of another exemplary first storage area of the network monitoring system of FIG. 1, including an exemplary dialog box cover program (DBCP)

Turning now to FIG. 6, another exemplary first storage area 132 is shown that may be used in a third exemplary embodiment. This third exemplary embodiment may be substantially similar to the embodiment utilized in the first exemplary method, except that the service component 310 additionally contains a dialog box cover program (DBCP) 390. Furthermore, in this exemplary embodiment, the browser 200 may be unable to respond to certain COM and DDE commands, thus preventing the first and second exemplary methods from being used.

Before describing the DBCP 390 in more detail, it should be noted that the browser 200 in this exemplary embodiment preferably has a "save as" functionality that may be chosen by the user 110. To illustrate, if a user 110 finds a web page that he/she wishes to save, a mouse or other input mechanism on the network device 130 may be used to click on a menu bar of the browser 200, causing a drop-down menu to appear. The user 110 may choose a "save as" option from the drop-down menu in order to save the web page to the second storage area 134. The "save as" option may also be invoked by the monitoring program 300 through an Application Program Interface (API) or menu command ID, such as the Microsoft Windows 32 Platform API (Win32 API) command PostMessage( )). This command may be sent directly to the browser 200 to call up the "save as" dialog box, and the HTML code or other information within the browser window may then be saved to the first storage area 132. For more information on Win32 APIs, one can refer to the Microsoft Software Developer's Kit (SDK) for Win32 API, the contents of which are incorporated in their entirety herein by reference.

In the present embodiment, the DBCP 390 may communicate with both the browser 200 and the interface program 380 using Win32 APIs. Preferably, when the interface program 380 invokes the "save as" option, the DBCP 390 prevents the user 110 from seeing the "save as" dialog box. Thus, the user 110 is preferably not disturbed while accessing the network 120. The DBCP 390 preferably hides the dialog box by moving it off a display screen of the network device 130, or behind the graphical window of the browser 200.

Figure 7:
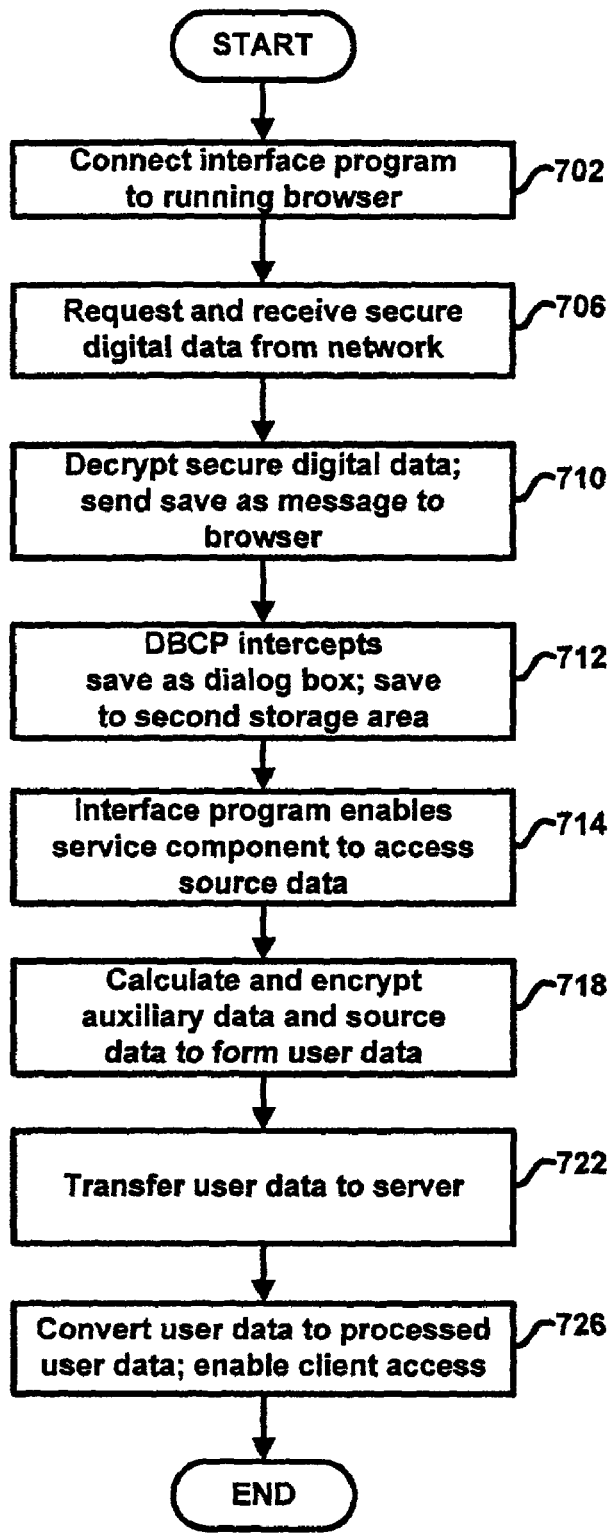
FIG. 7 is a flow chart of an exemplary method of the network monitoring system of FIGS. 1 and 6.

Turning now to FIG. 7, a third exemplary method utilizing the DBCP 390 is shown. Steps 702, 706 may be substantially similar to steps 502, 506, respectively, of the first exemplary method. In step 710, the browser 200 may decrypt secure digital data 122 (e.g., an HTTPS web page) downloaded from the network 120 and convert it to source data 230 (e.g., an HTTP web page). Additionally, the interface program 380 may issue an API and/or menu command ID (e.g., Win32 API postMessage( )) to the browser 200 to save the source data 230 to the second storage area 134 by selecting the "save as" function of the browser 200.

In step 712, the DBCP 390 may intercept the "save as" dialog box and prevent the user 110 from seeing the dialog box, and the source data 230 may then be saved to the second storage area 134. The remaining steps in the third exemplary method (steps 714-726) may be substantially similar to steps 514-526, respectively, in the first exemplary method.

Figure 8:
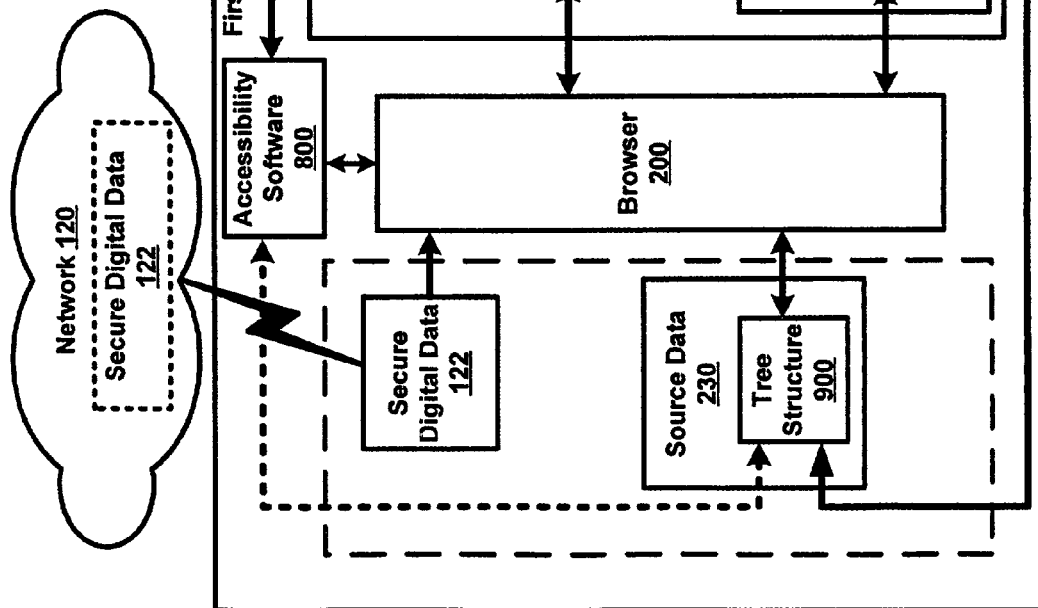
FIG. 8 is a block diagram of another exemplary first storage area of the network monitoring system of FIG. 1, including an exemplary tree structure.

Turning now to FIG. 8, another exemplary first storage area 132 is shown that may be used in a fourth exemplary embodiment. This embodiment may be substantially the same as the embodiment utilized in the first exemplary method except that the interface program 380 may include a tree program 976, and the source data 230 may include a tree structure 900, which may be an organization of nodes containing data. The tree program 976 may further include a root program 980, a traverse program 986 and a save program 990. Furthermore, the first storage area 132 may also contains accessibility software 800 in communication with the tree structure 900. As shown in FIG. 8, both the accessibility software 800 and the tree structure 900 may be in communication with the browser 200 and the monitoring program 300. Further, FIG. 8 shows an encrypted tree structure 904, which may be an encrypted version of the tree structure 900.

The accessibility software 800 preferably enables data that is accessed by programs running on the network device 130 to be represented within a tree structure. For example, in this exemplary embodiment, the tree structure 900 corresponds to the browser 200 and therefore, the content that is shown on the browser's graphical window may be represented within the various nodes of the tree structure 900.

Furthermore, accessibility programs often enable programs to communicate with one another by allowing each program to access the tree structures of other programs. This feature often enables programs to be customized for people with disabilities, such as individuals who have poor vision or are hard of hearing. An example of the accessibility software 800 that may be used with the present embodiment is Microsoft Accessibility API, manufactured by Microsoft Corporation. More information on the Microsoft Accessibility API can be found in the Microsoft Accessibility Applications Software Developer's Kit (MSAA SDK). The MSAA SDK is hereby incorporated in its entirety herein by reference. It should be understood that this description of a commercial embodiment of the accessibility software 800 is intended to illustrate, not limit, the spirit and scope of the present embodiment.

It should be further understood that elements of the accessibility program 800 or the entire program itself may be integrated with the tree program 976. For example, the tree program 976 may contain elements and functionality obtained from the accessibility program 800. Furthermore, in this exemplary embodiment, the root program 980, the traverse program 986, and the save program 990 may all use commands from the MSAA SDK. Additionally, in an alternate embodiment, the root program 980, the traverse program 986 and/or the save program 990 may be separate from the tree program 976, and may be stored outside of the monitoring program 300.

Figure 9:
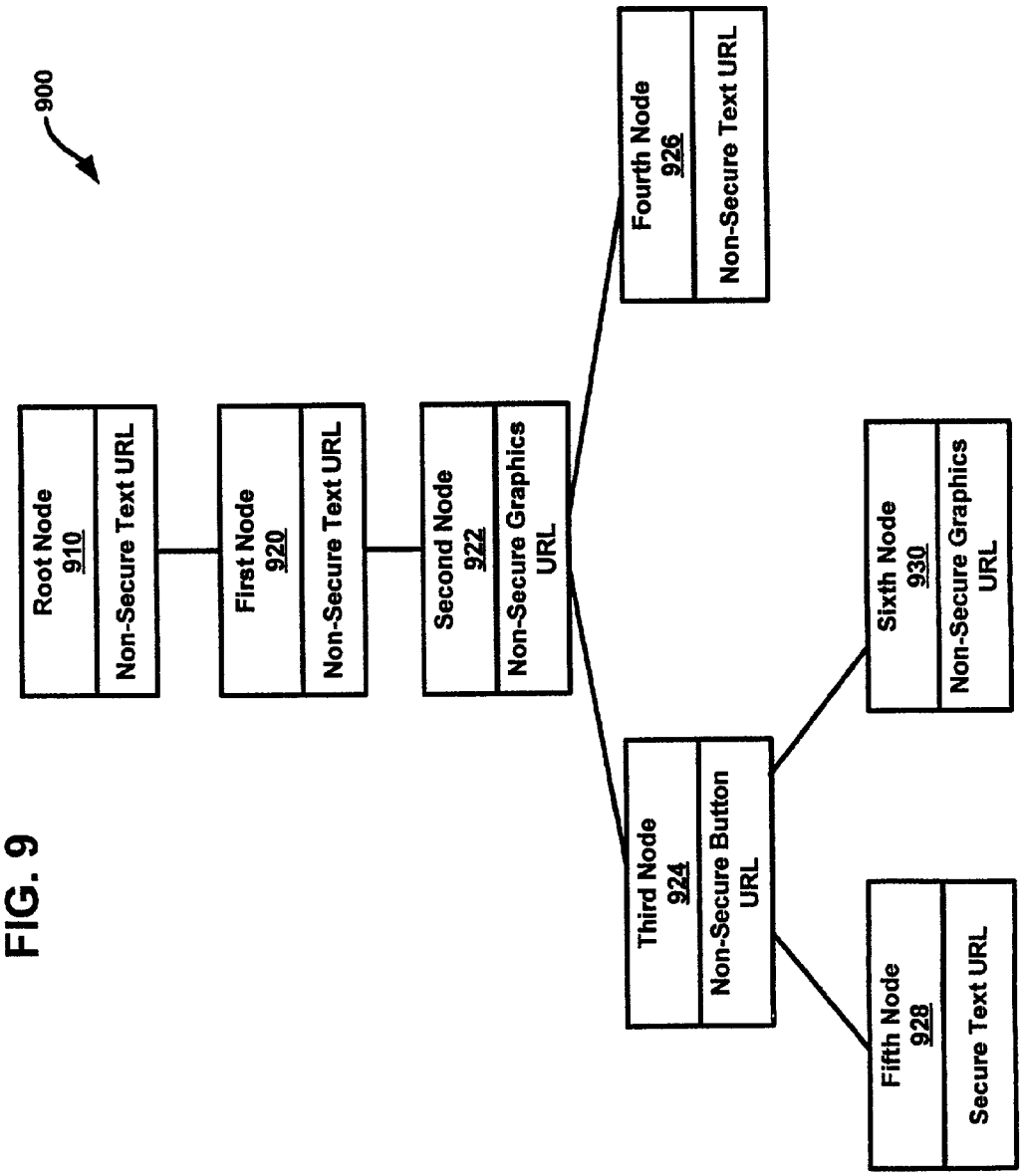
FIG. 9 is a block diagram of the exemplary tree structure of FIG. 8.

Turning now to FIG. 9, the exemplary tree structure 900 is shown in more detail. The tree structure 900 may include any number of nodes containing data related to the content of a web page accessed by the browser 200. In the present embodiment, a root node 910 may form the root of the tree structure 900. A first node 920 may be connected below the root node 910, and a second node 922 may be connected below the first node 920. A third node 924 and a fourth node 926 may be connected below the second node 922, and a fifth node 928 and a sixth node 930 may be connected below the third node 940. It should be understood that the number and organization of nodes within the tree structure 900 may vary in alternate embodiments, depending on the type of browser 200 utilized, the content of the web page accessed, and/or the desired functionality of the tree structure 900.

The root node 910 may contain general information relating to the data accessed by the browser 200, such as the title of the web page accessed. The root node 910 may also provide a starting place when searching the tree structure 900. The other nodes 920-930 within the tree structure 900 may contain secure or non-secure URL links, such as text, graphics, and button URL links. In the present embodiment, nodes 920, 922, 924, 926, and 930 contain non-secure URL links, and the fifth node 928 contains a secure text URL link. However, it should be noted that in alternate embodiments, any of the nodes 910-930 may contain any type of data known in the art (e.g., lists of text items, graphical icons, etc).

Having described the tree structure 900, the tree program 976 may now be discussed. The tree program 976 may include the root program 980, the traverse program 986, and the save program 990. The root program 980 may enable the interface program 380 to find the root node 910 of the tree structure 900. In the present embodiment, this may be accomplished by utilizing the AccessibleObjectFromWindows command found in the MSAA SDK, though it should be understood that other commands may be utilized with the present embodiment.

The traverse program 986 may traverse the nodes of the tree structure 900 after the root program 980 has already found the root node 910 of the tree structure 900. Further, the traverse program 986 may read the data stored in each node of the tree structure 900 and determine whether the URL stored in that node is secure. The WM_GetObject command found in the MSAA SDK may be used in this exemplary embodiment by the traverse program 980 to traverse the tree structure 900. It should be understood that in alternate embodiments, the method of traversing the tree structure 900 may vary, and that other programs and commands outside of the accessibility program 800 and tree program 976 may be utilized to traverse the tree structure 900.

The save program 990 may save any number of nodes within the tree structure 900 to the second storage area 134. This may be done by traversing through the entire tree structure 900 using the traverse program 986 and saving each relevant node (e.g., node containing secure data) individually to the second storage area 134. Of course, the method of saving the tree structure 900 may vary in alternate embodiments and may depend on the file structure and/or operating system of the network device 130. For example, the entire tree structure 900 may be saved all at once, or in a piecemeal fashion.

Figure 10:
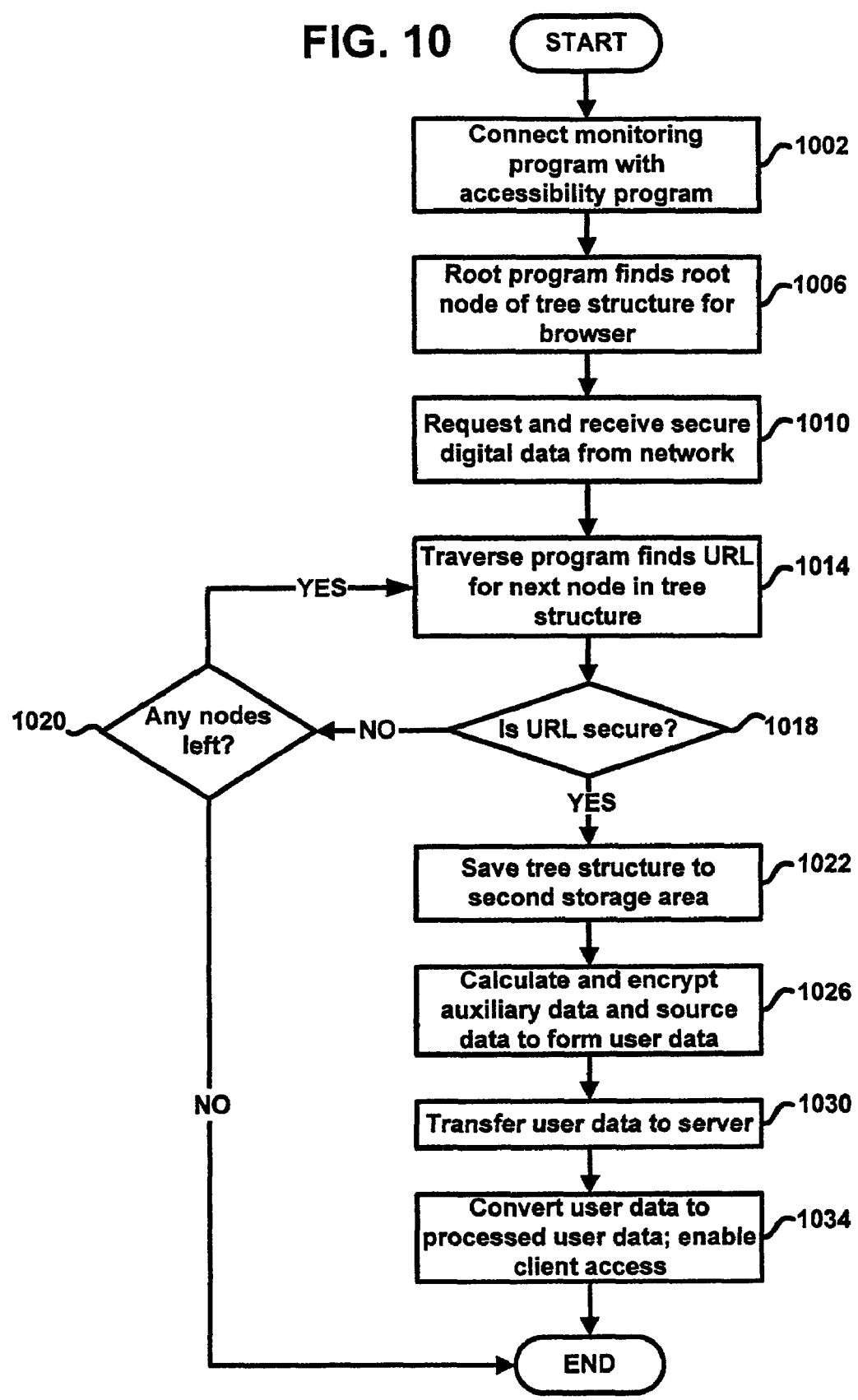
FIG. 10 is a flow chart of an exemplary method of the network monitoring system of FIGS. 1 and 8.

Turning now to FIG. 10, a fourth exemplary method utilizing the accessibility software 800 is shown. In step 1002, the accessibility software 800 may be connected to the monitoring program 300 through the tree program 976, and components of the accessibility software 800 may be loaded into the tree program 976.

In step 1006, the root program 980 may find the root node 910 of the tree structure 900 corresponding to the browser 200. In step 1010, the browser 200 may request and receive a secure web page (e.g., the secure digital data 122) from the network 120, as in previously described step 506.

In step 1014, the traverse program 986 may find a URL stored within a node in the tree structure 900. For example, in this exemplary embodiment, the traverse program 986 may begin by finding the URL associated with the root node 910. The method then proceeds to step 1018, where the traverse program 986 may determine whether the URL associated with the node being accessed is secure (e.g., whether the URL points to an HTTPS web page).

If the URL is not secure, the method proceeds to step 1020, where the traverse program 986 may determine whether there are any other nodes left in the tree structure 900 to be checked. If there are no other nodes in the tree structure 900 to be checked, the method ends. However, if there are nodes left in the tree structure 900 to be checked, the method loops back to step 1014, and the traverse program 986 moves down the tree structure 900 to the next node. This loop may continue until the traverse program 986 has checked the entire tree structure 900 and found no secure URLs, or the traverse program 986 finds a secure URL.

Corresponding to the exemplary tree structure 900, the present method may loop between 1014 and 1020 until the traverse program 986 reaches the fifth node 928, which contains a secure text URL. The method may then proceed to step 1022, where the save program saves the tree structure 900 to the second storage area 134. Alternatively, only a portion of the tree structure 900 (e.g., the fifth node 928) may be saved to the second storage area 134.

In step 1026, the auxiliary data program 320 may calculate auxiliary data (not shown) from the tree structure 900 instead of from the source data 230 as in previous embodiments. The auxiliary data may then be converted into encrypted auxiliary data 340 by the encryption program 314. Additionally, the encryption program 314 may convert the tree structure 900 into an encrypted tree structure 904. The user data 350 may thus be formed, including the encrypted auxiliary data 340 and encrypted tree structure 904.

In step 1030, the delivery module 376 may transfer the user data 350 to the user server 140. The user data 350 may then be deleted from the second storage area 134. Alternatively, if the connection to the network 120 is not operable, the user data 350 may be retained on the second storage area 134 for a period of time until the network connection is restored.

In step 1034, the user server 140 may utilize the processing program 410 to convert the user data 350 into log data 430. The manner in which the user data 350 is converted into log data 430 is preferably similar to previous exemplary embodiments, except that the processing program 410 may extract the log data 430 from the tree structure 900. The log data 430 may then be parsed and converted into processed user data 440, similar to previous embodiments. Further, the log data 430 may be stored on the data storage unit 144, and the processed user data 440 may be stored on the database 150. The client 180 may then access the processed user data 440 on the database 150 through the client server 170. The client 180 may have to supply an identification and password in order to access the processed user data 440, though this may vary in alternate embodiments.

The exemplary embodiments presented here may have numerous advantages. By providing a system and method for monitoring secure data transfers, the present embodiments may enable tracking the content of secure web pages viewed by a user and secure data that a user submits over a network such as the Internet. A wide range of useful data may be gathered, such as information about user preferences, characteristics of electronic commerce transactions, and popularity of various goods and services. Such information may help businesses design products and services that match the needs of users, which may improve both the quantity and the quality of goods and services that can be purchased online.

It should be understood that a wide range of changes and modifications may be made to the embodiments described above. For example, the monitoring program 300 may include any number or combination of the different embodiments of the interface program 380, thus enabling the monitoring program 300 to communicate with the browser 200 under a variety of protocols. Additionally, the connection between the client 180 and the client server 170, and/or the connection between the user 110 and the network device 130 may include a connection through the network 120. In addition, the interface object 380 may use alternate mechanisms for communicating with the browser, such as an Object Linking and Embedding (OLE) standard protocol handler, where OLE is a protocol that works within the COM specification to further define the manner in which certain COM-compliant objects may communicate. Further, the monitoring program 300 may include a decryption program to decrypt the secure digital data 122 downloaded from the network 120. It should therefore be understood that the foregoing description illustrates rather than limits the present invention, and that it is the following claims, including all equivalents, which define this invention:

What is claimed is:

1. A network monitoring system comprising:
   a network device in communication with a user and a network;
   a browser stored in the network device, the browser to request secure digital data from a content provider in communication with the network and receive the secure digital data from the content provider; and
   a monitoring program stored in the network device and in communication with the browser, the browser to convert at least a portion of the secure digital data into unencrypted source data by decrypting the secure digital data, the monitoring program to instruct the browser to store a copy of the unencrypted source data; and the monitoring program to transfer at least a portion of the unencrypted source data to a server in communication with the network to determine auxiliary data from the unencrypted source data, the auxiliary data including timer data and input-tracking data relating to activities of the browser,
   wherein the browser is to receive a user instruction to access the secure digital data and the browser is to request the secure digital data from the content provider using secure hypertext transfer protocol in response to the user instruction.

2. The network monitoring system of claim 1, wherein the monitoring program comprises an interface program.

3. The network monitoring system of claim 2, wherein the interface program comprises a Component Object Model object.

4. The network monitoring system of claim 3, wherein the interface program comprises a Dynamic Data Exchange program.

5. The network monitoring system of claim 1, wherein the unencrypted source data is saved on a storage area on the network device.

6. The network monitoring system of claim 1, wherein the unencrypted source data is converted into encrypted source data, and auxiliary data is converted into encrypted auxiliary data, and the encrypted source data and encrypted auxiliary data collectively comprise user data.

7. The network monitoring system of claim 6, wherein the server receives the user data, and the server stores a processing program to convert the user data or a portion thereof into processed data.

8. The network monitoring system of claim 7, further comprising a database accessible by the server to store the processed data, the processed data being accessible to a client.

9. The network monitoring system of claim 1, wherein the secure digital data comprises a web page encoded within a secure socket layer protocol and the network comprises the Internet.

10. A network monitoring system as defined in claim 1, wherein the secure digital data includes hypertext markup language instructions.

11. A network monitoring system comprising:
    a network device in communication with a user and a network;
    a browser stored in the network device, the browser to request secure digital data from a content provider in communication with the network and receive the secure digital data from the content provider; and
    a monitoring program stored in the network device and in communication with the browser, the browser to convert at least a portion of the secure digital data into unencrypted source data by decrypting the secure digital data, the monitoring program to instruct the browser to store a copy of the unencrypted source data; and the monitoring program to transfer at least a portion of the unencrypted source data to a server in communication with the network to determine auxiliary data from the unencrypted source data, the auxiliary data including timer data and input-tracking data relating to activities of the browser,
    wherein the monitoring program comprises an interface program, and
    wherein the interface program comprises a Component Object Model object, a Dynamic Data Exchange program, and a tree program, and the unencrypted source data comprises a tree structure, wherein the tree program is in communication with the tree structure and accessibility software.

12. The network monitoring system of claim 11, wherein the interface program comprises a root program, a traverse program, and a save program.

13. A network monitoring system comprising:
    a network device in communication with a user and a network;
    a browser stored in the network device, the browser to request secure digital data from a content provider in communication with the network and receive the secure digital data from the content provider; and
    a monitoring program stored in the network device and in communication with the browser, the browser to convert at least a portion of the secure digital data into unencrypted source data by decrypting the secure digital data, the monitoring program to instruct the browser to store a copy of the unencrypted source data; and the monitoring program to transfer at least a portion of the unencrypted source data to a server in communication with the network to determine auxiliary data from the unencrypted source data, the auxiliary data including timer data and input-tracking data relating to activities of the browser,
    wherein the unencrypted source data is saved on a storage area on the network device and the monitoring program further comprises a dialog box cover program to hide a save as dialog box of the browser from the user while the unencrypted source data is saved to the storage area on the network device.

14. A method for monitoring secure digital data, the method comprising:
- transferring the secure digital data from a network to a network device executing a browser and a monitoring program in communication with the browser, wherein the browser requests secure digital data from a content provider in communication with the network and receives the secure digital data from the content provider;
- converting the secure digital data into unencrypted source data by decrypting the secure digital data with the browser of the network device;
- instructing, via the monitoring program, the browser to store a copy of the unencrypted source data; and
- forwarding at least a portion of the unencrypted source data to a server
- wherein the browser is to receive a user instruction to access the secure digital data and the browser requests the secure digital data from the content provider using a secure hypertext transfer protocol in response to the user instruction.

15. The method of claim 14 further comprising utilizing a Component Object Model object to access the unencrypted source data.

16. The method of claim 14 further comprising utilizing a Dynamic Data Exchange program to access the unencrypted source data.

17. The method of claim 14 further comprising utilizing a tree structure program to access a tree structure.

18. The method of claim 17 further comprising saving a node of the tree structure to a storage area of the network device if the node contains a secure Universal Resource Locator.

19. The method of claim 14 further comprising saving the unencrypted source data on a storage area of the network device.

20. The method of claim 14, further comprising encrypting the unencrypted source data and auxiliary data determined from the unencrypted source data.

21. A method for monitoring secure digital data, the method comprising:
- transferring the secure digital data from a network to a network device executing a browser and a monitoring program in communication with the browser, wherein the browser requests secure digital data from a content provider in communication with the network and receives the secure digital data from the content provider;
- converting the secure digital data into unencrypted source data by decrypting the secure digital data with the browser of the network device;
- instructing, via the monitoring program, the browser to store a copy of the unencrypted source data;
- forwarding at least a portion of the unencrypted source data to a server; and
- saving the unencrypted source data on a storage area of the network device, wherein saving the unencrypted source data comprises invoking a save as functionality of a browser using an application program interface.

22. The method of claim 21 further comprising utilizing a dialog box cover program to hide a save as dialog box associated with the save as functionality.

23. A network monitoring system on a network device, the network monitoring system comprising at least one tangible computer readable medium excluding signals and storing instructions that, when executed, implement at least:
- a service component; and
- an interface program to communicate with the service component and a browser, the browser to request and receive secure digital data representing a webpage from a content provider in communication with a network and to convert the secure digital data into unencrypted source data by decrypting the secure digital data, the interface program to enable the service component to instruct the browser to store a copy of the unencrypted source data; the interface program to enable the service component to access the unencrypted source data, and the service component to determine auxiliary data from at least a portion of the unencrypted source data, the auxiliary data including timer data and input-tracking data relating to activities of the browser,
- wherein the browser is to receive a user instruction to access the secure digital data and the browser is to request the secure digital data from the content provider using a secure hypertext transfer protocol in response to the user instruction.

24. The network monitoring system of claim 23, wherein the interface program comprises at least one of a Component Object Model object, a Dynamic Data Exchange program, and a tree program.

25. The network monitoring system of claim 23, wherein the service component comprises an encryption program to convert the unencrypted source data into encrypted source data and the auxiliary data into encrypted auxiliary data.

26. The network monitoring system of claim 25, wherein the service component comprises a delivery module to transfer the encrypted source data and the encrypted auxiliary data to the server.

27. A tangible computer readable medium excluding signals and storing instructions that, when executed, cause a machine to at least:
- transfer secure digital data from a network to a network device executing a browser and a monitoring program in communication with the browser, wherein the browser requests secure digital data from a content provider in communication with the network and receives the secure digital data from the content provider;
- convert the secure digital data into unencrypted source data by decrypting the secure digital data with the browser of the network device;
- instruct, via the monitoring program, the browser to store a copy of the unencrypted source data; and
- forward at least a portion of the unencrypted source data to a server,
- wherein the browser is to receive a user instruction to access the secure digital data and the browser requests the secure digital data from the content provider using a secure hypertext transfer protocol in response to the user instruction.

* * * * *

UNITED STATES PATENT AND TRADEMARK OFFICE
CERTIFICATE OF CORRECTION

Page 1 of 1

PATENT NO. : 8,271,778 B1
APPLICATION NO. : 10/202338
DATED : September 18, 2012
INVENTOR(S) : Zhou et al.

It is certified that error appears in the above-identified patent and that said Letters Patent is hereby corrected as shown below:

In Column 15, Line 17 (Claim 14):
Replace "to a server"
with --to a server,--

Signed and Sealed this
Eighteenth Day of December, 2012

David J. Kappos
*Director of the United States Patent and Trademark Office*